United States Patent [19]
Saito et al.

[11] Patent Number: 5,420,837
[45] Date of Patent: May 30, 1995

[54] RECORDING CONDITION DETERMINATION METHOD AND APPARATUS UPON EXECUTION OF OVER-WRITE OPERATION ON MAGNETOOPTICAL DISK BY HEAT SHUT OFF METHOD AND PULSE TRAIN METHOD, AND MAGNETOOPTICAL RECORDING METHOD AND APPARATUS

[75] Inventors: Jun Saito, Tokyo; Shinichi Kurita, Yokohama, both of Japan

[73] Assignee: Nikon Corporation, Tokyo, Japan

[21] Appl. No.: 141,620

[22] Filed: Oct. 27, 1993

[30] Foreign Application Priority Data

Oct. 28, 1992 [JP] Japan ................... 4-289165
Oct. 13, 1993 [JP] Japan ................... 5-255416

[51] Int. Cl.$^6$ .............................................. G11B 11/00
[52] U.S. Cl. ........................... 369/13; 360/59; 360/114
[58] Field of Search ............... 369/13, 288, 275.2, 369/14, 284, 286, 272; 360/59, 114, 131, 135; 365/122, 10, 32

[56] References Cited

U.S. PATENT DOCUMENTS

| | | | |
|---|---|---|---|
| 4,910,622 | 3/1990 | Saito et al. .................. | 369/13 X |
| 5,164,926 | 11/1992 | Matsumoto ................... | 369/13 |
| 5,235,569 | 8/1993 | Matsumoto et al. .......... | 369/13 |
| 5,239,524 | 8/1993 | Sato et al. .................... | 369/13 |

OTHER PUBLICATIONS

The Bell System Technical Journal, vol. 62 (1983), pp. 1923–1936.

Standard ECMA/TC31/92/36, European Computer Manufacturers Association, 3rd Draft Proposal, Sep. 1992, "Information Interchange on Second Generation 130 mm Optical Disk Cartridges, Rewritable and Worm, Using the Magneto-Optical Effect, and Read Only" (two pages).

*Primary Examiner*—Georgia Y. Epps
*Assistant Examiner*—Ali Meyzari
*Attorney, Agent, or Firm*—Shapiro and Shapiro

[57] ABSTRACT

In a magnetooptical recording method and apparatus the intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$. The intensity $P_L$ is selected from an intensity range defined between an upper limit and a lower limit. The upper limit is a laser beam intensity for maintaining a pre-heat state in which a temperature on the magnetooptical disk becomes a predetermined temperature $\Theta_{pre}$, and is also an intensity which does not cause the high-temperature cycle. The lower limit is an intensity at which a mark formed by the high-temperature cycle can be erased. At least one of $P_L$, $T_{off}$, and $P_{LB}$ is controlled to achieve the pre-heat state within a time until the intensity is raised to $P_H$ again. At least one of $P_{W2}$, $P_{LT}$, and a time $T_{W2}$ for maintaining $P_{W2}$ is controlled, so that a temperature, after an elapse of $T_{W1}$, at a peak temperature position or a spot center position of the laser beam radiated onto the magnetooptical disk surface becomes equal to a temperature after an elapse of $T_{W2}$.

112 Claims, 13 Drawing Sheets

RECORDING CONDITION DETERMINATION METHOD AND APPARATUS UPON EXECUTION OF OVER-WRITE OPERATION ON MAGNETOOPTICAL DISK BY HEAT SHUT OFF METHOD AND PULSE TRAIN METHOD, AND MAGNETOOPTICAL RECORDING METHOD AND APPARATUS

BACKGROUND OF THE INVENTION

1. Field of the Invention

The present invention relates to a method and apparatus for determining a recording condition upon execution of over-writing on an over-write capable magnetooptical disk by a heat shut off method and a pulse train method, and a magnetooptical recording method and apparatus. Over-writing is a procedure for recording new information without erasing previously recorded information. In this case, when recorded information is reproduced, the previously recorded information must not be reproduced. "Over-writing" mentioned in the present specification is a procedure for executing over-writing by simply irradiating a laser beam while pulse-modulating the laser beam according to information to be recorded without modulating the direction and intensity of a bias field Hb.

2. Related Background Art

In recent years, many efforts have been made to develop an optical recording/reproduction method which can satisfy various requirements including high density, large capacity, high access speed, and high recording-/reproduction speed, and a recording apparatus, a reproduction apparatus, and a recording medium used therefor.

Of various optical recording/reproduction methods, the magnetooptical recording/reproduction method is most attractive due to its unique advantages in that information can be erased after it is recorded, new information can be recorded, and such an operation can be repetitively performed.

A recording medium used in the magnetooptical recording/reproduction method has a perpendicular magnetic layer or layers as a recording layer. The magnetic layer consists of, for example, amorphous GdFe or GdCo, GdFeCo, TbFe, TbCo, TbFeCo, and the like. The perpendicular magnetic layer normally has concentrical or spiral tracks, and information is recorded on the tracks. There are two types of tracks, i.e., explicit tracks and implicit tracks.

Explicit Track

A magnetooptical recording medium has a disk shape. When a disk having explicit tracks is viewed from a direction perpendicular to the disk plane, spiral or concentric tracks for recording information are formed. A groove for tracking and separation is present between two adjacent tracks. Contrary to this, a portion between adjacent grooves is called a land. In practice, the lands and grooves are reversed on the upper and lower surfaces of the disk. Thus, when the disk is viewed from the same direction as the beam incidence direction, a near portion is called a groove, and a far portion is called a land. A perpendicular magnetic film is formed on both the grooves and lands. For this reason, a groove portion may be used as a track, and a land portion may be used as a track. The widths of the groove and land have no special relationship therebetween.

In order to form such lands and grooves, lands formed on a surface in a spiral or concentrical pattern, and grooves each sandwiched between two adjacent grooves are present on a substrate. A perpendicular magnetic film is formed on such a substrate. Thus, the perpendicular magnetic film has lands and grooves transferred thereon.

Mark

In this specification, one of "upward" and "downward" directions of magnetization with respect to a film surface is defined as an "A direction", and the other one is defined as a "non-A direction".

Information to be recorded is binary-coded in advance, and is recorded by two signals, i.e., a mark ($B_1$) having an "A-directed" magnetization, and a mark ($B_0$) having a "non-A-directed" magnetization. These marks $B_1$ and $B_0$ respectively correspond to one and the other of "1" and "0" levels of a digital signal. However, in general, the direction of magnetization of the recording tracks is aligned in the "non-A direction" by applying a strong external field before recording. This "aligning process" is called initialize* in a conventional sense. Thereafter, a mark ($B_1$) having an "A-directed" magnetization is formed on the tracks. Information is expressed in accordance with the presence/absence and-/or the mark length of the mark ($B_1$). Note that a mark is often called a pit or bit previously but called a mark recently.

In order to re-use a recorded medium, (1) the medium must be re-initialized* by an initialize* device, (2) an erase head having the same arrangement as a recording head must be added to a recording apparatus, or (3) as preliminary processing, recorded information must be erased using a recording apparatus or an erasing apparatus. Therefore, in the magnetooptical recording method, it has been difficult to perform an over-write operation, which can properly record new information regardless of the presence/absence of recorded information.

If the direction of a bias field Hb can be desirably modulated between the "A-direction" and "non-A direction", an over-write operation is possible. However, it is impossible to modulate the direction of the bias field Hb at high speed. For example, if the bias field Hb comprises a permanent magnet, the direction of the magnet must be mechanically reversed. However, it is impossible to reverse the direction of the magnet at high speed. Even when the bias field Hb comprises an electromagnet, it is also impossible to modulate the direction of a large capacity current at high speed.

However, according to remarkable technical developments, a magnetooptical recording method capable of performing an over-write operation by modulating only the intensity of a light beam to be irradiated in accordance with binary-coded information to be recorded without modulating the strength (including an ON/OFF state) or the direction of the bias field Hb, an over-write capable magnetooptical recording medium used in this method, and an over-write capable recording apparatus used in this method were invented and filed as a patent application (Japanese Patent Laid-Open Application No. 62-175948 corresponding to DE 3,619,618A1 and to U.S. Ser. No. 453,255). This invention will be quoted as the basic invention hereinafter.

Description of the Basic Invention

The basic invention uses an "over-write capable multilayered magnetooptical recording medium which includes a recording layer (to be referred to as a memory layer or M layer hereinafter in this specification) which consists of a perpendicularly magnetizable magnetic thin film, and a reference layer (to be referred to as a writing layer or W layer hereinafter in this specification) which consists of a perpendicularly magnetizable magnetic thin film, and in which the two layers are exchange coupled, and the direction of magnetization of only the W layer can be aligned in a predetermined direction without changing the direction of magnetization of the M layer at room temperature".

Information is expressed and recorded by a mark having an "A-directed" magnetization" and a mark having a "non-A-directed" magnetization in the M layer (in some cases, also in the W layer).

In this medium, the direction of magnetization of the W layer can be aligned in an "A direction" by an external means (e.g., an initial field Hini.). At this time, the direction of magnetization of the M layer is not reversed. Furthermore, the direction of magnetization of the W layer which has been aligned in the "A direction" is not reversed upon application of an exchange coupling force from the M layer. In contrast to this, the direction of magnetization of the M layer is not reversed upon application of an exchange coupling force from the W layer aligned in the "A direction".

The W layer has a lower coercivity $H_C$ and a higher Curie temperature $T_C$ than those of the M layer.

According to a recording method of the basic invention, only the direction of magnetization of the W layer of the recording medium is aligned in the "A direction" by an external means before recording. This process will be specially referred to as "initialize" in this specification. The "initialize" process is unique to an overwrite capable medium.

Thereafter, a laser beam which is pulse-modulated in accordance with binary-coded information is radiated on the medium. The laser beam intensity has high level $P_H$ and low level $P_L$. These high and low levels correspond to high and low levels of a pulse. Note that low level is higher than reproduction level $P_r$ to be radiated on the medium in a reproduction mode. As is already known, even in a non-recording state, for example, the laser beam is turned on at <very low level> so as to, e.g., access a predetermined recording position on the medium. This <very low level> is also equal to or approximate to the reproduction level $P_r$.

For example, upon radiation of a laser beam of low level $P_L$, the temperature of the medium which is "initialized" in the "A direction" increases, and a coercivity $H_{C1}$ of the M layer becomes very small or zero in an extreme case. At this time, a coercivity $H_{C2}$ of the W layer is sufficiently large, and is not reversed by the "non-A-directed" bias field Hb. At this time, the force of the W layer acts on the M layer via the exchange coupling force. For this reason, the direction of magnetization of the M layer having the very small coercivity $H_{C1}$ is directed in a predetermined direction (e.g., "A direction") controlled by the W layer. Even if the magnetization of the M layer is zero, when radiation of the laser beam is stopped, and the medium temperature naturally decreases to a temperature slightly lower than a Curie temperature $T_{C1}$, magnetization appears in the M layer. At this time, the force of the W layer similarly acts on the M layer via the exchange coupling force. For this reason, the direction of magnetization, which appears in the M layer, is aligned in the predetermined direction (e.g., "A direction") controlled by the W layer. The medium temperature returns from this state to room temperature, but the direction of magnetization is maintained in the predetermined direction. However, if the M or W layer has a compensation temperature in the middle of this return process, when the medium temperature becomes lower than the compensation temperature, the direction of magnetization of the M or W layer is reversed. This process is called a low-temperature cycle.

On the other hand, upon radiation of a laser beam of high level $P_H$, the temperature of the medium, which is initialized in the "A direction", increases, the coercivity $H_{C1}$ of the M layer becomes zero, and the coercivity $H_{C2}$ of the W layer becomes very small or zero in an extreme case. For this reason, the magnetization of the W layer having the very small coercivity $H_{C2}$ is defeated by the bias field Hb, and its direction is aligned in a predetermined direction (e.g., "non-A direction"). Even if the magnetization of the M layer is zero, when radiation of the laser beam is stopped, and the medium temperature naturally decreases to a temperature slightly lower than a Curie temperature $T_{C2}$, magnetization appears in the W layer. At this time, the magnetization of the W layer is similarly defeated by the bias field Hb, and its direction is aligned in the predetermined direction (e.g., "non-A direction"). When the medium temperature further decreases to a temperature slightly lower than the Curie temperature $T_{C1}$, magnetization appears in the M layer. At this time, the force of the W layer applies to the M layer via the exchange coupling force. For this reason, the direction of magnetization, which appears in the M layer, is aligned in the predetermined direction (e.g., "non-A direction") controlled by the W layer. The medium temperature returns from this state to room temperature, but the direction of magnetization is maintained in the predetermined direction. However, if the M or W layer has a compensation temperature in the middle of this return process, when the medium temperature becomes lower than the compensation temperature, the direction of magnetization of the M or W layer is reversed. This process is called a high-temperature cycle.

The above-mentioned low- and high-temperature cycles occur irrespective of the directions of magnetization of the M and W layers. In any case, the W layer need only be "initialized" before radiation of the laser beam. Thus, the over-write operation is enabled.

In the basic invention, a laser beam is pulse-modulated according to information to be recorded. However, this procedure itself has been performed in the conventional magnetooptical recording method, and a means for pulse-modulating the beam intensity on the basis of binary-coded information to be recorded is a known means. For example, see "THE BELL SYSTEM TECHNICAL JOURNAL, Vol. 62 (1983), pp. 1923–1936 for further details. Therefore, the modulating means is available by partially modifying the conventional beam modulating means if required high and low levels of the beam intensity are given. Such a modification would be easy for those who are skilled in the art if high and low levels of the beam intensity are given.

One characteristic feature of the basic invention lies in high and low levels of the beam intensity. More specifically, when the beam intensity is at high level, "A-directed" magnetization of the W layer is reversed to the "non-A direction" by an external means such as a bias field Hb and the like, and a mark having the "non-A-directed" [or "A-directed"] magnetization is thus formed in the M layer by means of the "non-A-directed" magnetization of the W layer. When the beam intensity is at low level, the direction of magnetization of the W layer is left unchanged from the "initialized" state, and a mark having the "A-directed" [or "non-A-directed"] magnetization is formed in the M layer under the influence of the W layer (this influence is exerted on the M layer through the exchange coupling force).

In this specification, if expressions ooo [or ΔΔΔ] appear, ooo outside the parentheses in the first expression corresponds to ooo in the subsequent expressions ooo [or ΔΔΔ], and vice versa.

A medium used in the basic invention is roughly classified into first and second categories. In either category, a recording medium has a multilayered structure including the M and W layers. The M layer is a magnetic layer, which exhibits a high coercivity at room temperature, and has a low reversing temperature. The W layer is a magnetic layer, which exhibits a relatively lower coercivity at room temperature and has a higher reversing temperature than those of the M layer. Note that each of the M and W layers may comprise a multilayered structure. If necessary, a third layer (e.g., an adjusting layer for an exchange coupling force $\sigma_w$: to be referred to as an Int. layer hereinafter) may be inserted between the M and W layers. For further details about the Int. layer, please refer to Japanese Laid-Open Patent Application Nos. 64-50257 and 1-273248. Since many references such as Japanese Patent Laid-Open Patent Application No. 4-123339 (corresponding to EP 475446 A3), Japanese. Patent Laid-Open Patent Application No. 4-134741 (corresponding to U.S. Pat. No. 5,164,926), and the like are available for information about over-write capable magnetooptical recording, a further description will be omitted here. Note that a disk having a four-layered structure disclosed in Japanese Patent Laid-Open Patent Application No. 4-123339 has an "initializing" layer (to be abbreviated as an I layer hereinafter), and a switching layer (to be abbreviated as an S layer hereinafter), formed between the I and W layers, for turning on/off an exchange-coupled state between these two layers, in addition to the M and W layers.

In such an over-write operation, when a disk is irradiated with a non-modulated laser beam of low level $P_L$, since previous information is erased, this process can be called "erase". After the previous information is erased, assume that a laser beam, which is pulse-modulated between low level $P_L$ and high level $P_H$ in accordance with information to be recorded, is radiated so as to form a mark, i.e., to record information. This mark will be specially referred to as a mark H hereinafter. With this method, even in the over-write operation, the waveform itself of the laser beam remains the same as that in the conventional method (non-over-write method). The value of high level $P_H$ seems to be equal to high level (first level) in the conventional method. However, if low level $P_L$ is zero, the low-temperature cycle does not occur. In view of this, low level $P_L$ in this method is different from low level (second level) in the conventional method in this sense.

A general optical recording method and apparatus will be described below.

An optical recording apparatus mainly comprises a laser source, a radiation optical system for radiating a laser beam emitted from the laser source onto an optical disk, a modulation means for modulating the laser beam intensity in accordance with information to be recorded, and a rotation means for the optical disk. In a magnetooptical recording apparatus, a magnetic means for applying a bias field Hb to the radiation position of the beam is added. Also, when a recording medium to be used is an over-write capable magnetooptical disk, and does not have any "initializing" layer disclosed in Japanese Patent Laid-Open Patent Application No. 4-123339, an initial field Hini. applying means is added to the recording apparatus.

Since optical recording exclusively utilizes a thermal nature of a laser beam (heat mode), the laser beam intensity need only be pulse-modulated between a relatively high first level and a relatively low base level (second level) in principle. When the laser beam intensity is at the first level, a mark is formed; when it is at the second level, no mark is formed. That is, one mark is formed in correspondence with one pulse. The second level can be zero since it does not form any mark. However, when a mark is to be formed, in other words, when the leading edge of a mark is to be formed, it is preferable that the disk temperature state immediately before formation be always positively maintained in a constant temperature state. Otherwise, the leading edge position varies depending on the temperature state immediately before formation. Such a variation disturbs high-density recording. Thus, it is preferable that an optical disk be pre-heated to a predetermined temperature $\Theta_{pre}$, i.e., be set in a pre-heat state, and the second level be normally set at an intensity $P_{pre}$ for maintaining this pre-heat state (temperature $\Theta_{pre}$). The temperature $\Theta_{pre}$ allows the disk temperature immediately before mark formation to be constant independently of the peak temperature position of the beam or the data pattern recorded at the spot center position, and $P_{pre}$ is given by the following formula:

$$\Theta_{pre} = A \times P_{pre} \times \{1 - \exp(-\infty/\tau)\} + \Theta A \qquad \text{formula (3)}$$

where A (°C./mW) is the heat efficiency of the laser beam intensity determined by the disk, the spot, and the recording line density, and $\Theta A$ (°C.) is the disk temperature in a non-radiation state of the beam.

The first mark formation is a method of forming one mark in correspondence with one pulse. FIG. 13 is a waveform chart of the laser beam intensity when one mark is formed by the first method. As shown in FIG. 13, a pulse waveform for raising the laser beam intensity from the base level (second level) $P_{pre}$ to start mark formation, and after the raised intensity (first level) $P_{W1}$ is maintained for a time $T_{W1}$ by a half-width, reducing the intensity to $P_{pre}$ is used. In this case, when the mark length is large, an adverse effect due to heat accumulation appears. The adverse effect is that even when the laser beam intensity is reduced to $P_{pre}$ to end mark formation, the medium temperature cannot be easily decreased to the mark formation start temperature or less due to the heat accumulation so far. For this reason, the mark length or width becomes unexpectedly large. This adverse effect is called "recording data pattern dependency of the mark formation end position, i.e., the mark trailing edge position". This dependency disturbs high-density recording, and decreases identifiability of data.

The second mark formation method can solve this problem to some extent. FIG. 14 is a waveform chart of the laser beam intensity when one mark is formed by the second method. As shown in FIG. 14, the intensity of the laser beam to be radiated onto the optical recording medium is raised from $P_{pre}$ to an intensity $P_{W1}$ higher than $P_{pre}$, and after $P_{W1}$ is maintained for a time $T_{W1}$, the intensity is reduced to an intensity $P_{LT}$ lower than $P_{W1}$. Thereafter, the intensity is modulated between $P_{LT}$ and an intensity $P_{W2}$ higher than $P_{LT}$. The time for maintaining $P_{W2}$ is $T_{W2}$, and the modulation period upon intensity modulation between $P_{LT}$ and $P_{W2}$ is $T_p$. This method is called a pulse train method since a waveform (see FIG. 13) which originally consists of one pulse consists of a start small pulse, and one or two or more following small pulses. In this case, the temperature at the laser beam radiation position on the optical disk during mark formation normally drifts up and down near a high temperature.

On the other hand, in the case of high-density recording, the start position of the next mark undesirably varies depending on the end position of the immediately preceding mark. This phenomenon is called "recording data pattern dependency of the mark formation start position, i.e., the mark leading edge position". In order to solve this problem, an optical recording method for, when the laser beam intensity is reduced to end mark formation, temporarily reducing the intensity to $P_{LB}$ lower than $P_{pre}$, and after an elapse of a time $T_{off}$, raising the intensity to $P_{pre}$ has been proposed. FIGS. 11 and 12 are waveform charts of the laser beam intensity when one mark is formed by this method. FIG. 11 shows a case wherein one mark is formed in correspondence with one pulse, and FIG. 12 shows a case wherein a mark is formed by the pulse train method. In this method, formation of the next mark is started from a predetermined position regardless of the length of the immediately preceding mark. In this manner, a thermal influence from the immediately preceding mark is shut off for the next mark. A condition for shutting off the thermal influence in this manner is called a "heat shut off condition", and is expressed by $P_{pre}$, $P_{LB}$, and $T_{off}$.

When recording is performed by the pulse train method, the disk temperature state immediately before formation must be positively kept constant at the beginning of writing of a mark, i.e., upon formation of the leading edge of a mark. As a method of realizing this, the above-mentioned heat shut off method is very effective. Therefore, the pulse train method is preferably used in combination with the heat shut off method.

When recording is performed by the over-write method, modulation of the laser beam intensity can be performed in the same manner as the above-mentioned general optical recording method. At this time, a relatively high first level corresponds to $P_H$, and a relatively low second level corresponds to $P_L$. Conventionally, when a mark is formed by the over-write method, it is achieved by the first mark formation method in the general optical recording method, i.e., by the method of simply forming a single mark in correspondence with a single pulse.

However, as described above, when recording is performed by the method of simply forming a single mark in correspondence with a single pulse, even in the over-write method, "recording data pattern dependency of the mark trailing edge position" and "recording data pattern dependency of the mark leading edge position" appear as in the general optical recording method, and disturb high-density recording.

SUMMARY OF THE INVENTION

In order to solve the above-mentioned problems, the present inventors applied the heat shut off method and the pulse train method to the over-write recording method. At this time, the intensity $P_L$ is controlled to correspond to the laser beam intensity $P_{pre}$, and to be selected from an intensity range having, as the upper limit, an intensity which does not cause the high-temperature cycle, and, as the lower limit, an intensity at which the mark H formed by the high-temperature cycle can be erased.

As described in STANDARD ECMA/TC31/92/36 3rd Draft Proposal, p. 87, European Computer Manufacturers Association (to be referred to as ECMA hereinafter) (see FIG. 15), the heat shut off condition and the pulse train condition in the general optical recording method are determined, so that $P_{LB}$ is equal to the laser beam intensity $P_r$ in the reproduction mode, $P_{LT}$ is equal to the intensity $P_{pre}$ for maintaining the pre-heat state (temperature $\Theta_{pre}$), $T_{off}$ is equal to a write clock period T, and $T_{W2}$ is $\frac{1}{2}$ of the write clock period T. Also, $P_{2W2}$ is determined to be a value, which can minimize "recording data pattern dependency of the mark trailing edge position" when a random pattern is recorded using optimal $P_{W1}$ and $P_{pre}$, which are determined in advance.

However, the present inventors found that when these fixed recording conditions are adopted in the over-write method without modifications, optimal recording conditions cannot be obtained for some magnetooptical disks to be used.

As a result of extensive studies, the present inventors found that a thermal time constant $\tau$ varies in units of magnetooptical disks, and invented a method and apparatus for determining optimal recording conditions (the heat shut off condition and the pulse train condition) in consideration of $\tau$. Also, the present inventors invented a method of executing an over-write operation using the determined recording conditions (magnetooptical recording method), an overwrite-capable magnetooptical recording apparatus, and the like.

DETAILED DESCRIPTION OF THE INVENTION

Figure 1:
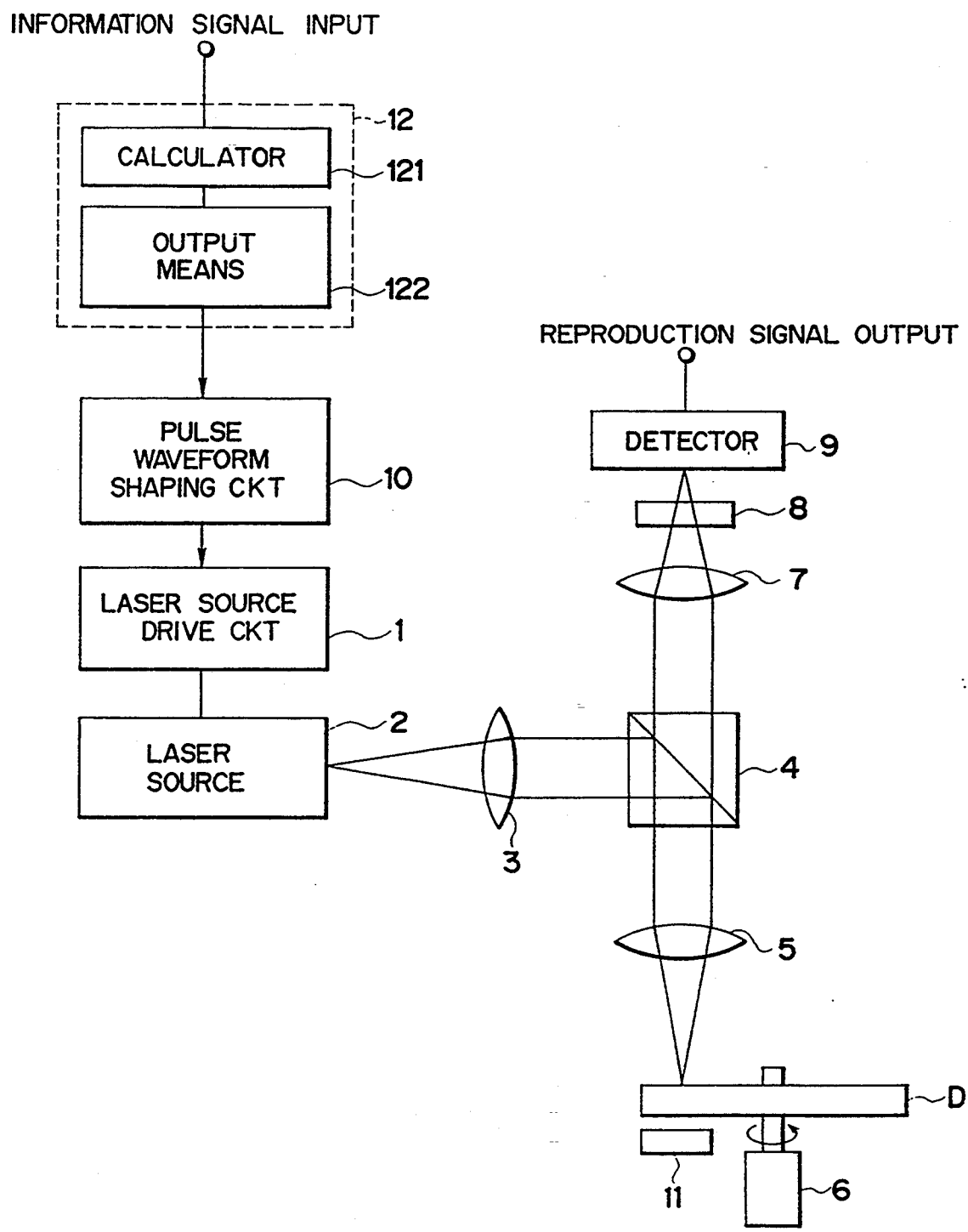
FIG. 1 is a diagram showing an arrangement of main part of a magnetooptical recording apparatus according to an embodiment of the present invention.

According to the first aspect of the invention, there is provided a magnetooptical recording method in which an intensity of a laser beam to be radiated onto an overwrite capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$, wherein the intensity $P_L$ is selected from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased, at least one of $P_L$, $T_{off}$, and $P_{LB}$ is controlled to achieve the pre-heat state within a time until the intensity is raised to $P_H$ again, and at least one of $P_{W2}$, $P_{LT}$, and a time $T_{W2}$ for maintaining $P_{W2}$ is controlled, so that a temperature, after an elapse of $T_{W1}$, at a peak temperature position or a spot center position of the laser beam radiated onto the magnetooptical disk surface becomes equal to a temperature after an elapse of $T_{W2}$.

According to the second aspect of the invention, there is provided a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$, wherein the intensity $P_L$ is selected from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased, and the respective values are determined as a combination for satisfying the following formulas (1) and (2):

$$T_{off} = \tau \times \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of the magnetooptical disk, and $T_{W2}$ is a time for maintaining $P_{W2}$.

According to the third aspect of the invention, in the method according to the first or second aspect of the invention, there is provided a magnetooptical recording method wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the pulse (1) on and from the magnetooptical disk to have a duty ratio of 50%, are respectively determined to be the values of $P_L$, $P_H$, $P_{LB}$, $T_{W1}$, and $T_{off}$.

According to the fourth aspect of the invention, in the method according to the first or second aspect of the invention, there is provided a magnetooptical recording method wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$", which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

According to the fifth aspect of the invention, in the method according to the first or second aspect of the invention, there is provided a magnetooptical recording method wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}''$", which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

According to the sixth aspect of the invention, in the method according to the first or second aspect of the invention, there is provided a magnetooptical recording method wherein the intensity $P_{LT}$ is set to be equal to the intensity $P_L$.

According to the seventh aspect of the invention, in the method according to the first or second aspect of the invention, there is provided a magnetooptical recording method wherein the intensity $P_{LT}$ is set to be higher than the intensity $P_L$.

According to the eighth aspect of the invention, in the method according to the first or second aspect of the invention, there is provided a magnetooptical recording method wherein the modulation period $T_p$ upon intensity-modulation of the laser beam between $P_{LT}$ and the intensity $P_{W2}$ higher than $P_{LT}$ is set to be equal to the write clock period T.

According to the ninth aspect of the invention, in the method according to the first or second aspect of the invention, there is provided a magnetooptical recording method wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}'$.

According to the 10th aspect of the invention, in the method according to the first or second aspect of the invention, there is provided a magnetooptical recording method wherein the time $T_{W2}$ is set to be equal to the time $T_p$, and the time for maintaining $P_{LT}$ is set to be zero.

According to the 11th aspect of the invention, in the method according to the first or second aspect of the invention, there is provided a magnetooptical recording method wherein the intensity $P_H$ is selected to be equal to or smaller than a value for forming a mark with a desired width as an upper limit.

According to the 12th aspect of the invention, in the method according to the first or second aspect of the invention, there is provided a magnetooptical recording method wherein the intensity $P_{W2}$ is set to be equal to the intensity $P_H$.

According to the 13th aspect of the invention, in the method according to the first or second aspect of the invention, there is provided a magnetooptical recording method wherein the intensity $P_{W2}$ is set to be lower than the intensity $P_H$.

According to the 14th aspect of the invention, in the method according to the first or second aspect of the invention, there is provided a magnetooptical recording method wherein the intensity $P_{LB}$ is set to be equal to a laser beam intensity in a reproduction mode or to be zero.

According to the 15th aspect of the invention, in the method according to the first or second aspect of the invention, there is provided a magnetooptical recording method wherein the time $T_{off}$ is set to be equal to or close to a value m/n times (m and n are natural numbers) of the write clock period T.

According to the 16th aspect of the invention, there is provided a magnetooptical recording apparatus comprising:

a laser source for emitting a laser beam;

radiation means for radiating the laser beam onto an over-write capable magnetooptical disk;

moving means for changing a radiation position of the laser beam on the magnetooptical disk;

first modulation means for raising an intensity of the laser beam to be radiated onto the magnetooptical disk from $P_L$ to an intensity $P_H$ higher than $P_L$, reducing the intensity to an intensity $P_{LT}$ lower than $P_H$ after $P_H$ is maintained for a time $T_{W1}$, and thereafter, intensity-modulating the laser beam at a period $T_p$ between $P_{LT}$ and an intensity $P_{W2}$ higher than $P_{LT}$ so as to form a mark by a high-temperature cycle;

second modulation means for reducing the intensity to an intensity $P_{LB}$ lower than $P_L$ after the mark is formed on the magnetooptical disk, and raising the intensity to $P_L$ after an elapse of a time $T_{off}$;

condition determination means for selecting $P_L$ from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased;

first control means for controlling at least one of $P_L$, $T_{off}$, and $P_{LB}$ so that the pre-heat state is established within a time period until the intensity is raised to $P_H$ again to form the next mark; and second control means for controlling at least one of $P_{W2}$, $P_{LT}$, and $T_{W2}$, so that a temperature, after an elapse of $T_{W1}$, at a peak temperature position or a spot center position of the laser beam radiated onto the magnetooptical disk surface becomes equal to a temperature after an elapse of $T_{W2}$.

According to the 17th aspect of the invention, there is provided a magnetooptical recording apparatus comprising:

a laser source for emitting a laser beam;

radiation means for radiating the laser beam onto an over-write capable magnetooptical disk;

moving means for changing a radiation position of the laser beam on the magnetooptical disk;

first modulation means for raising an intensity of the laser beam to be radiated onto the magnetooptical disk from $P_L$ to an intensity $P_H$ higher than $P_L$, reducing the intensity to an intensity $P_{LT}$ lower than $P_H$ after $P_H$ is maintained for a time $T_{W1}$, and thereafter, intensity-modulating the laser beam at a period $T_p$ between $P_{LT}$ and an intensity $P_{W2}$ higher than $P_{LT}$ so as to form a mark by a high-temperature cycle;

second modulation means for reducing the intensity to an intensity $P_{LB}$ lower than $P_L$ after the mark is formed on the magnetooptical disk, and raising the intensity to $P_L$ after an elapse of a time $T_{off}$;

condition determination means for selecting $P_L$ from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; and condition determination means for determining the respective values as a combination for satisfying the following formulas (1) and (2):

$$T_{off} = \tau \times \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of the magnetooptical disk, and $T_{W2}$ is a time for maintaining $P_{W2}$.

According to the 18th aspect of the invention, in the apparatus according to the 16th or 17th aspect of the invention, there is provided a magnetooptical recording apparatus wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be the values of $P_L$, $P_H$, $P_{LB}$, $T_{W1}$, and $T_{off}$.

According to the 19th aspect of the invention, in the apparatus according to the 16th or 17th aspect of the invention, there is provided a magnetooptical recording apparatus wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$", which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and According to the 20th aspect of the invention, in the apparatus according to the 16th or 17th aspect of the invention, there is provided a magnetooptical recording apparatus wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$", which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

According to the 21st aspect of the invention, in the apparatus according to the 16th or 17th aspect of the invention, there is provided a magnetooptical recording apparatus wherein the intensity $P_{LT}$ is set to be equal to the intensity $P_L$.

According to the 22nd aspect of the invention, in the apparatus according to the 16th or 17th aspect of the invention, there is provided a magnetooptical recording apparatus wherein the intensity $P_{LT}$ is set to be higher than the intensity $P_L$.

According to the 23rd aspect of the invention, in the apparatus according to the 16th or 17th aspect of the invention, there is provided a magnetooptical recording apparatus wherein the modulation period $T_p$ upon intensity-modulation of the laser beam between $P_{LT}$ and the intensity $P_{W2}$ higher than $P_{LT}$ is set to be equal to the write clock period T.

According to the 24th aspect of the invention, in the apparatus according to the 16th or 17th aspect of the invention, there is provided a magnetooptical recording apparatus wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

According to the 25th aspect of the invention, in the apparatus according to the 16th or 17th aspect of the invention, there is provided a magnetooptical recording apparatus wherein the time $T_{W2}$ is set to be equal to the time $T_p$, and the time for maintaining $P_{LT}$ is set to be zero.

According to the 26th aspect of the invention, in the apparatus according to the 16th or 17th aspect of the invention, there is provided a magnetooptical recording apparatus wherein the intensity $P_H$ is selected to be equal to or smaller than a value for forming a mark with a desired width as an upper limit.

According to the 27th aspect of the invention, in the apparatus according to the 16th or 17th aspect of the invention, there is provided a magnetooptical recording apparatus wherein the intensity $P_{W2}$ is set to be equal to the intensity $P_H$.

According to the 28th aspect of the invention, in the apparatus according to the 16th or 17th aspect of the invention, there is provided a magnetooptical recording apparatus wherein the intensity $P_{W2}$ is set to be lower than the intensity $P_H$.

According to the 29th aspect of the invention, in the apparatus according to the 16th or 17th aspect of the invention, there is provided a magnetooptical recording apparatus wherein the intensity $P_{LB}$ is set to be equal to a laser beam intensity in a reproduction mode or to be zero.

According to the 30th aspect of the invention, in the apparatus according to the 16th or 17th aspect of the invention, there is provided a magnetooptical recording apparatus wherein the time $T_{off}$ is set to be equal to or close to a value m/n times (m and n are natural numbers) of the write clock period T.

According to the 31st aspect of the invention, there is provided in a method for determining conditions for a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$;

a magnetooptical recording condition determination method wherein the intensity $P_L$ is selected from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased, a combination of $P_L$, $T_{off}$, and $P_{LB}$ is determined, so that the pre-heat state is established within a time period until the intensity is raised to $P_H$ again to form the next mark, and a combination of $P_{W2}$, $P_{LT}$, and $T_{W2}$ is determined, so that a temperature, after an elapse of $T_{W1}$, at a peak temperature position or a spot center position of the laser beam radiated onto the magnetooptical disk surface becomes equal to a temperature after an elapse of $T_{W2}$ ($T_{W2}$ is a time for maintaining $P_{W2}$).

According to the 32nd aspect of the invention, there is provided in a method for determining conditions for a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$;

a magnetooptical recording condition determination method wherein the intensity $P_L$ is selected from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased, and the respective values are determined as a combination for satisfying the following formulas (1) and (2):

$$T_{off} = \tau \times \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of the magnetooptical disk, and $T_{W2}$ is a time for maintaining $P_{W2}$.

According to the 33rd aspect of the invention, in the method according to the 31st or 32nd aspect of the invention, there is provided a magnetooptical recording condition determination method wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be the values of $P_L''$, $P_H$, $P_{LB}$, $T_{W1}$, and $T_{off}$.

According to the 34th aspect of the invention, in the method according to the 31st or 32nd aspect of the invention, there is provided a magnetooptical recording condition determination method wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

According to the 35th aspect of the invention, in the method according to the 31st or 32nd aspect of the invention, there is provided a magnetooptical recording condition determination method wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

According to the 36th aspect of the invention, in the method according to the 31st or 32nd aspect of the invention, there is provided a magnetooptical recording condition determination method wherein the intensity $P_{LT}$ is set to be equal to the intensity $P_L$.

According to the 37th aspect of the invention, in the method according to the 31st or 32nd aspect of the invention, there is provided a magnetooptical recording condition determination method wherein the intensity $P_{LT}$ is set to be higher than the intensity $P_L$.

According to the 38th aspect of the invention, in the method according to the 31st or 32nd aspect of the invention, there is provided a magnetooptical recording condition determination method wherein the modulation period $T_p$ upon intensity-modulation of the laser beam between $P_{LT}$ and the intensity $P_{W2}$ higher than $P_{LT}$ is set to be equal to the write clock period T.

According to the 39th aspect of the invention, in the method according to the 31st or 32nd aspect of the invention, there is provided a magnetooptical recording condition determination method wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

According to the 40th aspect of the invention, in the method according to the 31st or 32nd aspect of the invention, there is provided a magnetooptical recording condition determination method wherein the time $T_{W2}$ is set to be equal to the time $T_p$, and the time for maintaining $P_{LT}$ is set to be zero.

According to the 41st aspect of the invention, in the method according to the 31st or 32nd aspect of the invention, there is provided a magnetooptical recording condition determination method wherein the intensity $P_H$ is selected to be equal to or smaller than a value for forming a mark with a desired width as an upper limit.

According to the 42nd aspect of the invention, in the method according to the 31st or 32nd aspect of the invention, there is provided a magnetooptical recording condition determination method wherein the intensity is set to be equal to the intensity $P_H$.

According to the 43rd aspect of the invention, in the method according to the 31st or 32nd aspect of the invention, there is provided a magnetooptical recording condition determination method wherein the intensity $P_{W2}$ is set to be lower than the intensity $P_H$.

According to the 44th aspect of the invention, in the method according to the 31st or 32nd aspect of the invention, there is provided a magnetooptical recording condition determination method wherein the intensity $P_{LB}$ is set to be equal to a laser beam intensity in a reproduction mode or to be zero.

According to the 45th aspect of the invention, in the method according to the 31st or 32nd aspect of the invention, there is provided a magnetooptical recording condition determination method wherein the time $T_{off}$ is set to be equal to or close to a value m/n times (m and n are natural numbers) of the write clock period T.

According to the 46th aspect of the invention, there is provided in an apparatus for determining conditions for a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$;

a magnetooptical recording condition determination apparatus comprising:

a first calculation unit for selecting the intensity $P_L$ from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased;

a second calculation unit for calculating a combination of $P_L$, $T_{off}$, and $P_{LB}$, so that the pre-heat state is established within a time period until the intensity is raised to $P_H$ again to form the next mark;

a third calculation unit for calculating a combination of $P_{W2}$, $P_H$, and $T_{W2}$, so that a temperature, after an elapse of $T_{W1}$, at a peak temperature position or a spot center position of the laser beam radiated onto the magnetooptical disk surface becomes equal to a temperature after an elapse of $T_{W2}$ ($T_{W2}$ is a time for maintaining $P_{W2}$); and an output unit for outputting the values calculated by the calculation units.

According to the 47th aspect of the invention, there is provided in an apparatus for determining conditions for a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on the magnetooptical disk by a high-temperature cycle, thereafter, the intensity is reduced to an intensity $P_{LB}$ lower than $P_L$, and the intensity is raised to $P_L$ after an elapse of a time $T_{off}$;

a magnetooptical recording condition determination apparatus comprising:

a first calculation unit for selecting the intensity $P_L$ from an intensity range defined between an upper limit and a lower limit, the upper limit being a laser beam intensity for maintaining a pre-heat state in which a temperature on the magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased;

a second calculation unit for calculating the respective values as a combination for satisfying the following formulas (1) and (2); and an output unit for outputting the values calculated by the calculation units:

$$T_{off} = \tau \times \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of the magnetooptical disk, and $T_{W2}$ is a time for maintaining $P_{W2}$.

According to the 48th aspect of the invention, in the apparatus according to the 46th or 47th aspect of the invention, there is provided a magnetooptical recording condition determination apparatus wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be the values of $P_L$, $P_H$, $P_{LB}$, $T_{W1}$, and $T_{off}$.

According to the 49th aspect of the invention, in the apparatus according to the 46th or 47th aspect of the invention, there is provided a magnetooptical recording condition determination apparatus wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}''$", which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

According to the 50th aspect of the invention, in the apparatus according to the 46th or 47th aspect of the invention, there is provided a magnetooptical recording condition determination apparatus wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from the magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W2}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$", which values provide a slice level common to reproduction signals respectively obtained by recording and reproducing a "long mark-short interval-long mark" pattern (densest pattern) and a "long interval-short mark-long interval" pattern (sparsest pattern) on and from the magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

According to the 51st aspect of the invention, in the apparatus according to the 46th or 47th aspect of the invention, there is provided a magnetooptical recording condition determination apparatus wherein the intensity $P_{LT}$ is set to be equal to the intensity $P_L$.

According to the 52nd aspect of the invention, in the apparatus according to the 46th or 47th aspect of the invention, there is provided a magnetooptical recording condition determination apparatus wherein the intensity $P_{LT}$ is set to be higher than the intensity $P_L$.

According to the 53rd aspect of the invention, in the apparatus according to the 46th or 47th aspect of the invention, there is provided a magnetooptical recording condition determination apparatus wherein the modulation period $T_p$ upon intensity-modulation of the laser beam between $P_{LT}$ and the intensity $P_{W2}$ higher than $P_{LT}$ is set to be equal to the write clock period T.

According to the 54th aspect of the invention, in the apparatus according to the 46th or 47th aspect of the invention, there is provided a magnetooptical recording condition determination apparatus wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

According to the 55th aspect of the invention, in the apparatus according to the 46th or 47th aspect of the invention, there is provided a magnetooptical recording condition determination apparatus wherein the time $T_{W2}$ is set to be equal to the time $T_p$, and the time for maintaining $P_{LT}$ is set to be zero.

According to the 56th aspect of the invention, in the apparatus according to the 46th or 47th aspect of the invention, there is provided a magnetooptical recording condition determination apparatus wherein the intensity $P_H$ is selected to be equal to or smaller than a value for forming a mark with a desired width as an upper limit.

According to the 57th aspect of the invention, in the apparatus according to the 46th or 47th aspect of the invention, there is provided a magnetooptical recording condition determination apparatus wherein the intensity $P_{W2}$ is set to be equal to the intensity $P_H$.

According to the 58th aspect of the invention, in the apparatus according to the 46th or 47th aspect of the invention, there is provided a magnetooptical recording condition determination apparatus wherein the intensity $P_{W2}$ is set to be lower than the intensity $P_H$.

According to the 59th aspect of the invention, in the apparatus according to the 46th or 47th aspect of the invention, there is provided a magnetooptical recording condition determination apparatus wherein the intensity $P_{LB}$ is set to be equal to a laser beam intensity in a reproduction mode or to be zero.

According to the 60th aspect of the invention, in the apparatus according to the 46th or 47th aspect of the invention, there is provided a magnetooptical recording condition determination apparatus wherein the time $T_{off}$ is set to be equal to or close to a value m/n times (m and n are natural numbers) of the write clock period T.

The general principle of the above-described methods and apparatuses will be described hereinafter.

The thermal time constant $\tau$ will be explained below.

Figure 5:
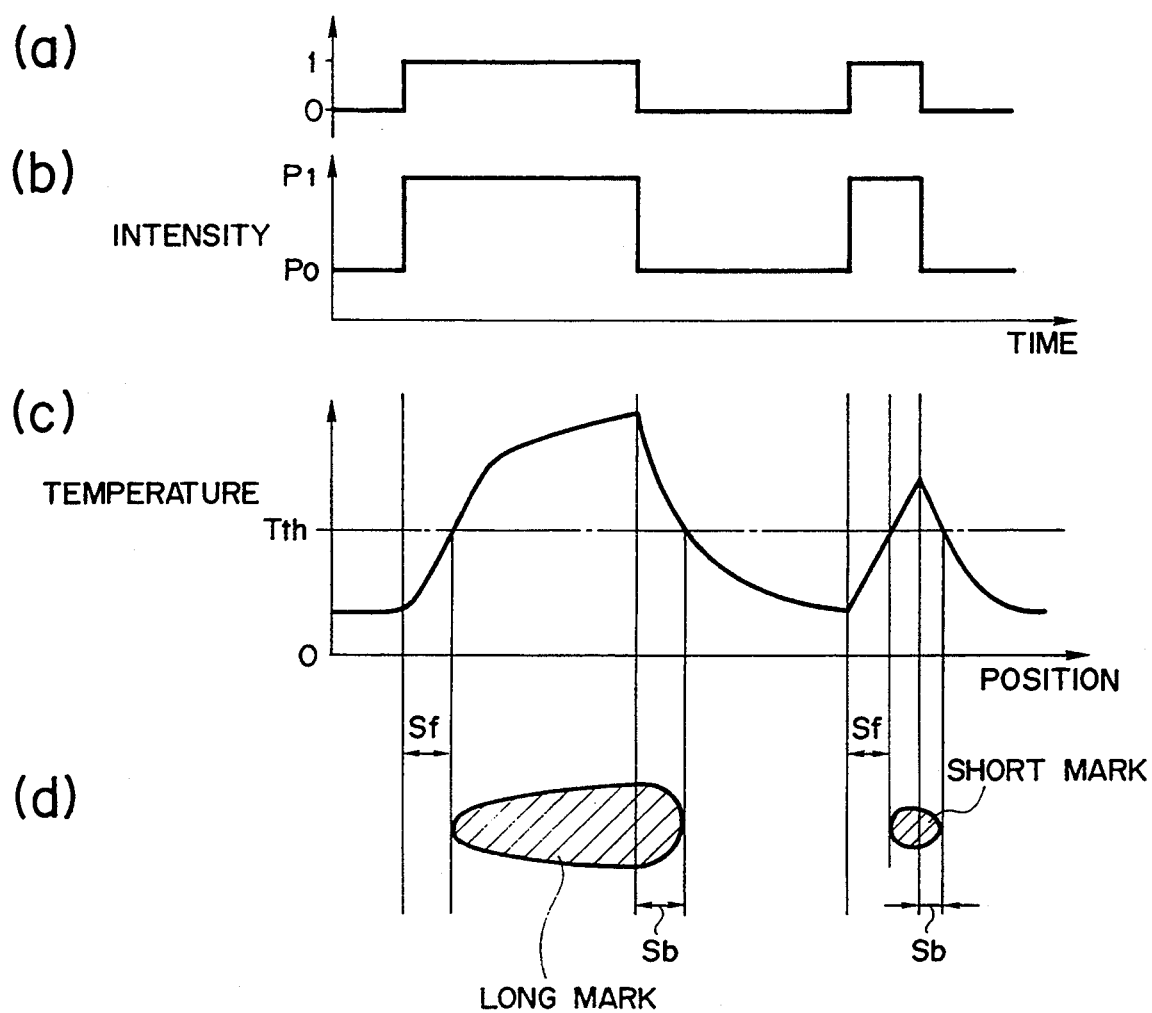
FIG. 5 includes an example of a pattern (waveform) of a data signal to be recorded, a chart (a chart of electric power to be input to a laser source) showing a light-emission intensity $P_1$ and a light-off intensity $P_0$ of the laser beam at that time, a temperature profile (elevated temperature profile) of the disk at that time, and an explanatory view showing the relationship of marks to be formed.

FIG. 5 includes an example (a) of a pattern (waveform) of a data signal to be recorded, a chart (a chart of electric power to be input to a laser source) (b) showing a light-emission intensity $P_1$ and a light-off intensity $P_0$ of the laser beam at that time, a temperature profile (elevated temperature profile) (c) of the disk at that time, and an explanatory view (d) showing the relationship of marks H to be formed.

Figure 6:
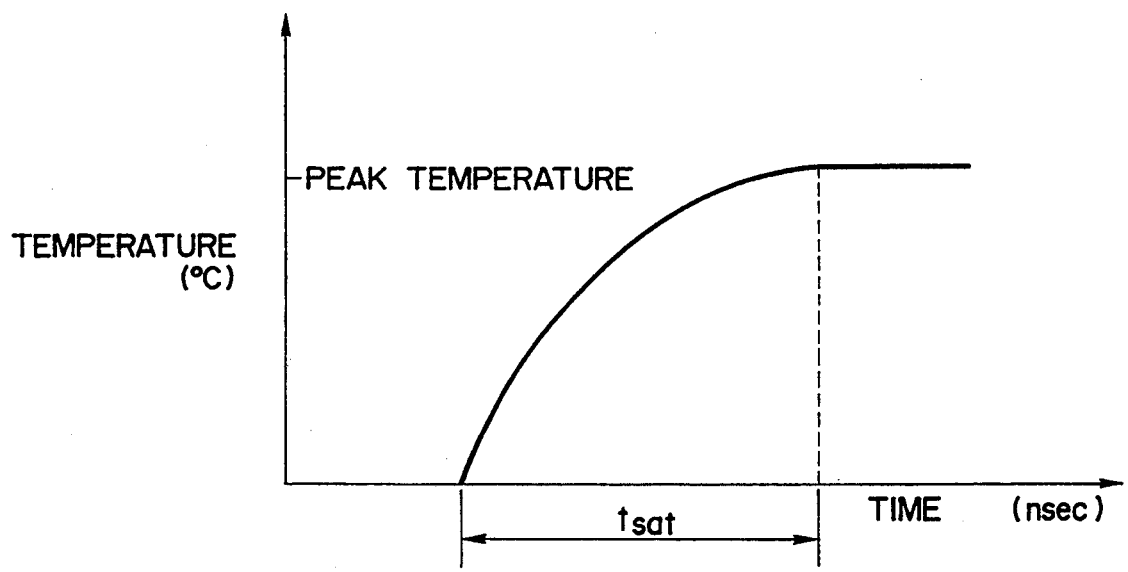
FIG. 6 is a graph of the temperature profile showing a time ($t_{sat}$) required until the temperature is saturated.

When optical recording is performed on an optical disk using a recording laser beam (pulse), optical disks are classified into two types, i.e., heat-insulation disks and heat-diffusion disks in terms of heat diffusion. Assume that a laser beam is raised from the light-off intensity to the light-emission intensity in a step-function pattern (like a rectangular wave), as shown in (b) in FIG. 5, in accordance with a data signal ((a) in FIG. 5). Since the heat-insulation disk tends to accumulate heat as compared to the heat-diffusion disk, a temperature elevation [°C./mW] per unit intensity of the laser beam, i.e., A in formula (3) is large. More specifically, when the laser beam is radiated at the same intensity for a long period of time, the temperature saturation level of the heat-insulation disk is higher than that of the heat-diffusion disk. On the other hand, the heat-insulation disk requires a longer time until the instantaneous (elevated) temperature profile or temperature profile is saturated than that of the heat-diffusion disk. FIG. 6 is a graph showing the temperature profile showing a time ($t_{sat}$) required until the temperature is saturated. More specifically, the heat-insulation disk has longer $t_{sat}$ in FIG. 6 than that of the heat-diffusion disk. This can be easily understood from the fact that an earthen teapot is harder to warm up and to cool down than an iron kettle is. The thermal time constant $\tau$ corresponds to $T_{sat}$. More specifically, a disk having long $t_{sat}$ has large $\tau$.

One of the present inventors made extensive studies, and invented a method of measuring the thermal time constant of a disk by measuring an optical disk itself in advance. This measurement method will be explained below.

<Thermal Time Constant Measurement Method>

Figure 7:
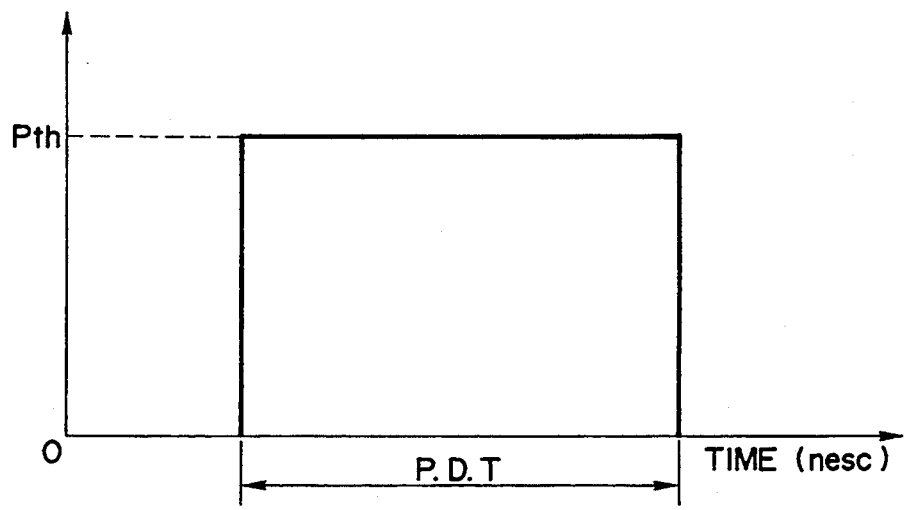
FIG. 7 is a waveform chart for explaining pulse duration time (P.D.T.)
Figure 8:
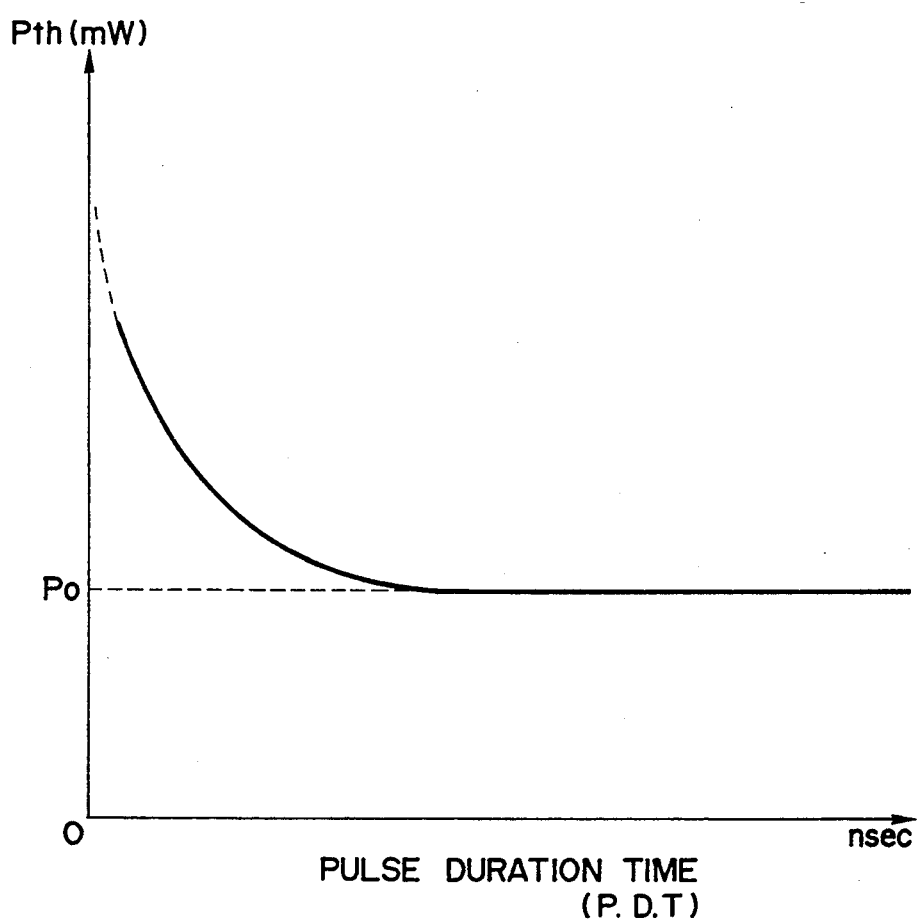
FIG. 8 is a graph wherein data are plotted while the ordinate represents $P_{th}$, and the abscissa represents P.D.T.

An optical disk to be measured, and an optical recording/reproduction apparatus for evaluating an optical disk (to be also referred to as an evaluation drive hereinafter) are prepared. A laser beam has N.A.=0.55, and a wavelength=830 nm, and both the rising and falling times of the laser beam are about 5 nsec. The optical disk is set on the evaluation drive, and is rotated so that the track of the disk has a measurement linear velocity (V=11.3 m/sec). The laser beam spot of the evaluation drive is radiated on the track under the servo control. More specifically, focusing and tracking servo devices are operated. Then, the laser beam is pulse-modulated. Upon radiation of the laser beam, the disk temperature is elevated. In this case, pulse modulation is performed to have a duty cycle, which can assure a time interval long enough not to cause interference of heat generated by heating of pulses. Pulses having various pulse duration times (to be abbreviated as P.D.T. hereinafter) are radiated onto the disk, and a "minimum power ($P_{th}$) capable of performing recording on the disk" of each P.D.T. is obtained. FIG. 7 is a waveform chart for explaining the P.D.T. FIG. 7 shows that a laser beam pulse is radiated on the disk with the "minimum power ($P_{th}$) capable of performing recording on the disk". FIG. 8 is a graph wherein data are plotted while the ordinate represents $P_{th}$, and the abscissa represents P.D.T. As shown in FIG. 8, $P_{th}$ decreases as P.D.T. is prolonged, and converges to a predetermined level $P_0$ after P.D.T reaches a certain value.

Figure 9:
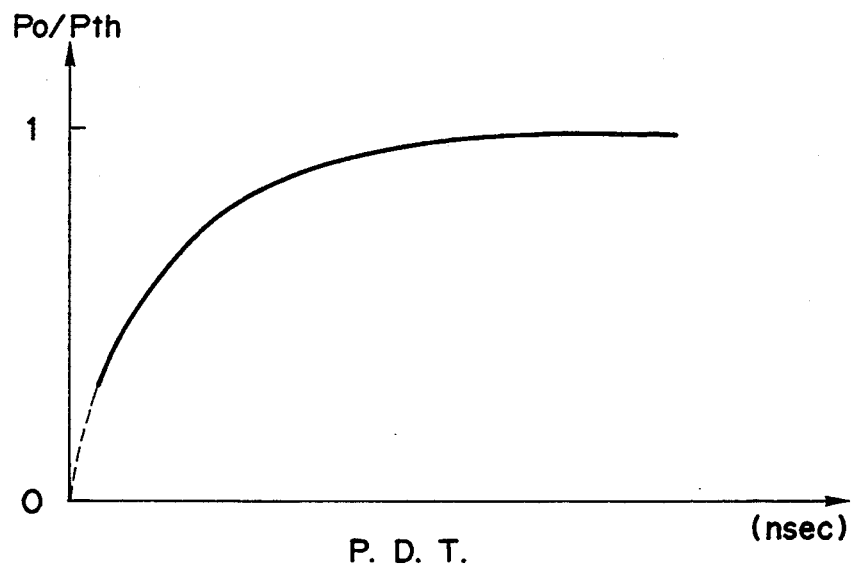
FIG. 9 is a graph wherein data are plotted while the ordinate represents $P_0/P_{th}$, and the abscissa represents P.D.T. (showing the elevated temperature profile of the disk)
Figure 10:
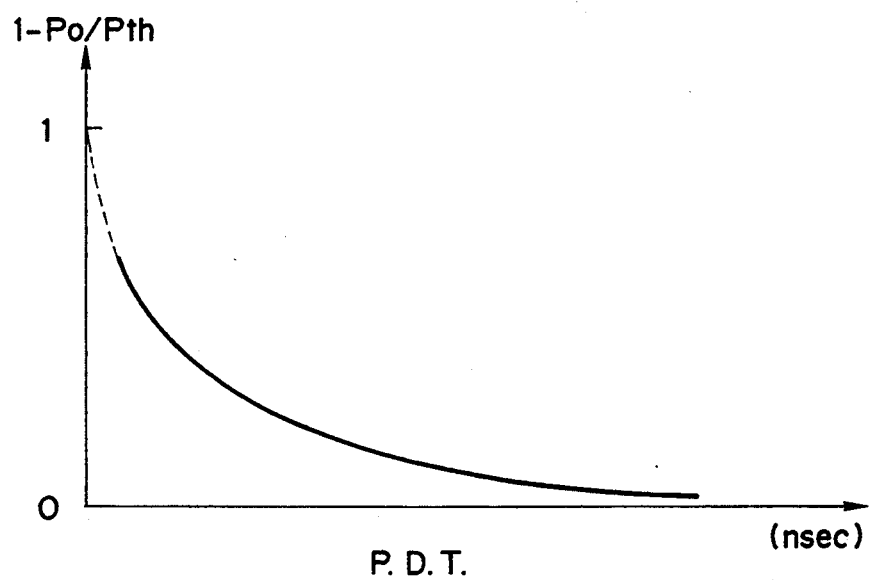
FIG. 10 is a graph wherein data are plotted while the ordinate represents $1-P_0/P_{th}$, and the abscissa represents P.D.T. (showing the decreased temperature profile of the disk)
Figure 11:
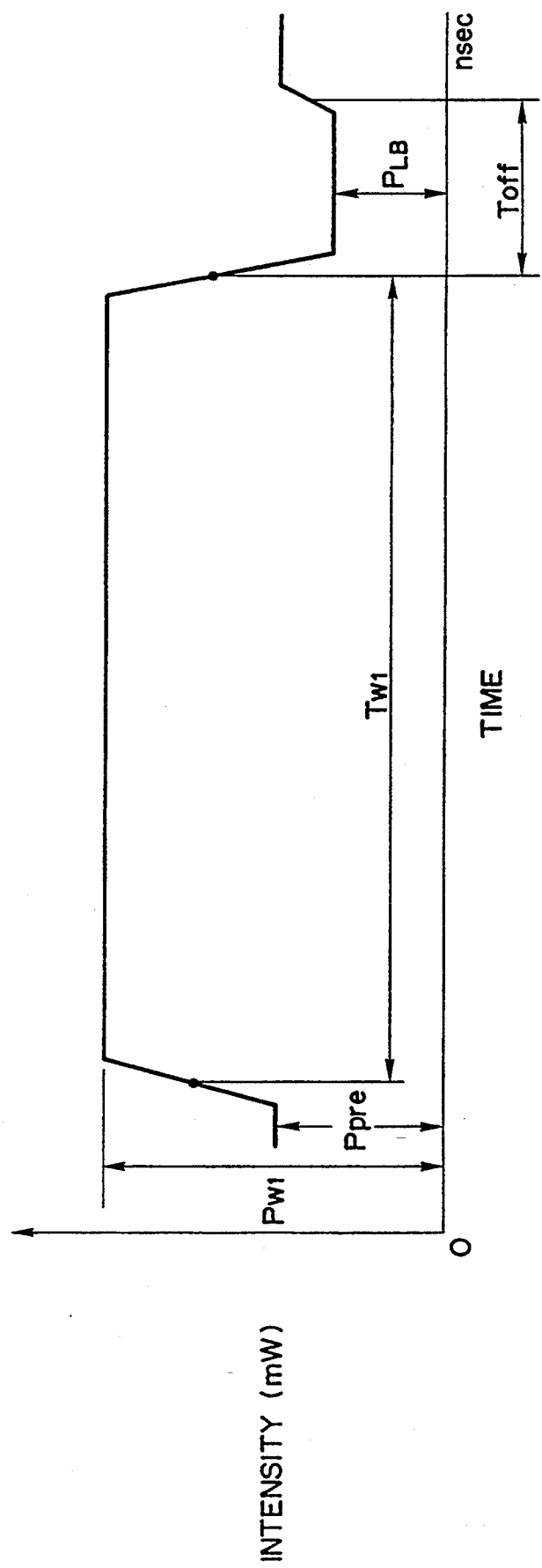
FIG. 11 is a waveform chart of a laser beam intensity when one mark is formed using a heat shut off method.
Figure 12:
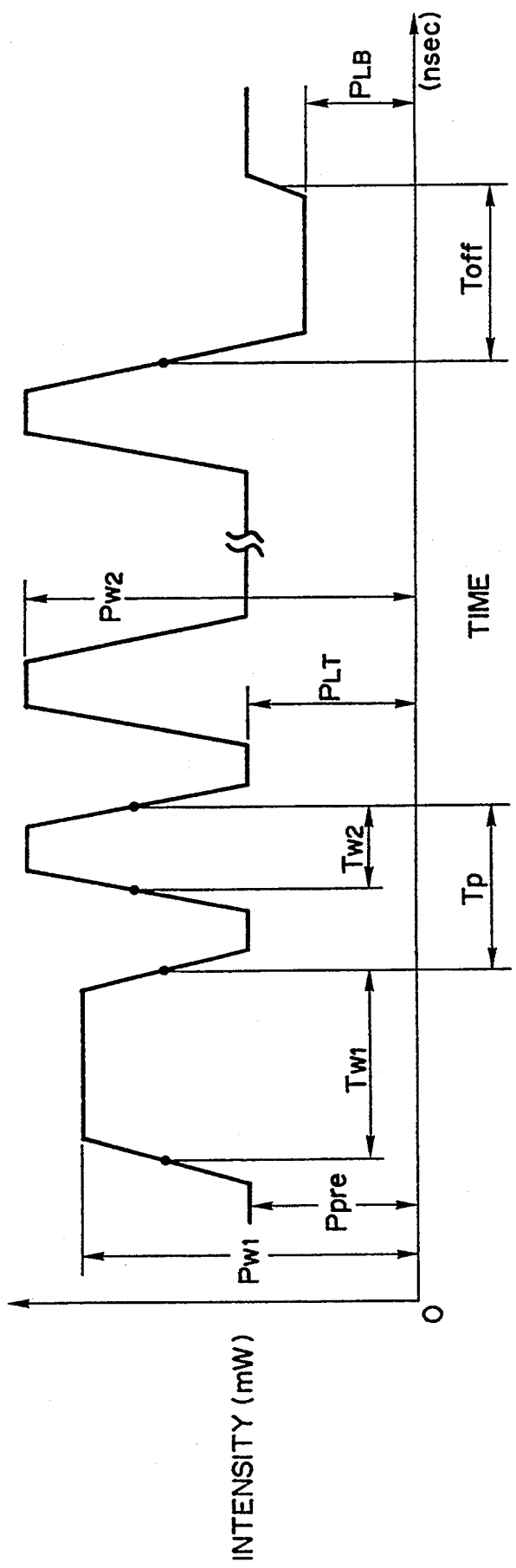
FIG. 12 is a waveform chart of a laser beam intensity when one mark is formed using the heat shut off method and a pulse train method.

Then, as shown in FIG. 9, data are plotted while the ordinate represents a reciprocal number of a value obtained by normalizing $P_{th}$ with $P_0$, i.e., $P_0/P_{th}$, and the abscissa represents P.D.T. This graph represents a thermal response function in an elevated temperature state obtained when the laser beam is radiated onto the disk. Also, as shown in FIG. 10, when the ordinate represents $1 - P_0/P_{th}$, the graph represents a thermal response function in a decreased temperature state obtained when the laser beam is turned off. When the thermal response function shown in FIG. 10 can be approximated to an exponential function $\exp(-t/\tau)$, $\tau$ represents the thermal time constant of the temperature elevation/decrease by the measured laser beam, of the measured optical disk at the measured linear velocity (V).

According to the present invention, optimal recording conditions (nine parameters, i.e., $P_L$, $P_H$, $T_{W1}$, $P_{W2}$, $T_p$, $T_{W2}$, $P_{LT}$, $P_{LB}$, and $T_{off}$) are obtained in accordance with $\tau$ of each magnetooptical disk. Thus, the "recording data pattern dependency of the mark trailing edge position" and "recording data pattern dependency of the mark leading edge position" can be minimized. When these dependencies are decreased, high-density recording can be precisely executed, and identifiability of data can be improved.

For the sake of easy manufacture, it is preferable that the modulation period $T_p$ upon intensity-modulation of the laser beam between $P_{LT}$ and the intensity $P_{W2}$ higher than $P_{LT}$ be set to be equal to the write clock period T, and the time $T_{W2}$ be set to be m/n times (m and n are natural numbers; m<n) of the modulation period $T_p$. Also, the intensity $P_{LT}$ may be set to be equal to $P_L$. Furthermore, the time $T_{W2}$ may be set to be equal to the time $T_p$, and the time for maintaining $P_{LT}$ may be set to be zero.

The intensity $P_H$ is preferably selected to be equal to or smaller than a value for forming a mark with a desired width as an upper limit. For the sake of easy manufacture, the intensity $P_{W2}$ may be set to be equal to the intensity $P_H$.

Furthermore, for the sake of easy manufacture, $P_{LB}$ is preferably set to be equal to the laser beam intensity in the reproduction mode or to be zero. Also, $T_{off}$ is preferably set to be equal to or close to a value m/n times (m and n are natural numbers) of the write clock period T.

DETAILED DESCRIPTION OF THE PREFERRED EMBODIMENT

A preferred embodiment of the present invention will be described in detail hereinafter. However, the present invention is not limited to this.

FIG. 1 is a diagram showing an arrangement of main part of a magnetooptical recording apparatus according to an embodiment of the present invention. This apparatus also serves as a reproduction apparatus, and mainly comprises a motor (rotation means 6) for rotating a magnetooptical recording medium D, a laser source 2, a laser source drive circuit 1 for pulse-modulating the laser beam intensity between high and low levels in accordance binary data to be recorded, a recording magnetic field applying means (permanent magnet 11), a pulse waveform shaping circuit 10, and a condition determination means 12. The pulse waveform shaping circuit 10 shapes the pulse waveform into a waveform shown in FIG. 2 (to be described later).

The condition determination means 12 comprises a calculation unit 121 for determining a combination of respective values ($P_L$, $P_H$, $T_{W1}$, $P_{W2}$, $T_p$, $T_{W2}$, $P_{LT}$, $P_{LB}$, and $T_{off}$) on the basis of formulas (1) and (2), and an output unit 122 for outputting the determined values. The calculation unit 121 determines the respective values based on formulas (1) and (2). The determined values are output from the output unit 122. The pulse waveform shaping circuit 10 shapes a pulse waveform on the basis of the output values.

As the medium D, a magnetooptical disk is set. The medium D is rotated by the rotation means 6, so that the linear velocity of tracks on the medium D has a predetermined value. A laser beam spot from the laser source 2 is radiated on a track under the servo control. That is, focusing and tracking servo devices (not shown) are operated. The laser beam emitted from the laser source 2 is pulse-modulated by the laser source drive circuit 1 in accordance with binary data to be recorded. The beam emitted from the laser source 2 is collimated via a collimator lens 3, and is reflected by a beam splitter 4. The reflected beam is focused by an objective lens 5, and forms a focal point on the medium D. Recording is thus basically completed.

In a reproduction mode, a DC-ON laser beam, which is not intensity-modulated, is radiated onto the medium D in the same manner as in a recording mode. Light reflected by the medium is caused to become incident on the beam splitter 4 via the objective lens 5. Light transmitted through the beam splitter 4 is focused by a focusing lens 7, and is caused to become incident on a detector 9. The state of rotation of the plane of polarization is converted into a change in light intensity via an analyzer 8 (polarizer) arranged between the focusing lens 7 and the detector 9. Thus, data recorded on the medium D, which is read as rotation of the plane of polarization, is converted into a change in light intensity. The change in light intensity is converted into electrical signal levels by the detector 9. This is the reproduction process.

In the above-mentioned apparatus, an over-write capable magnetooptical disk having $\tau$=55 nsec (V=11.3 m/sec) measured by the above-mentioned measurement method of $\tau$ was prepared. After the entire surface of the disk was "initialized", the magnetooptical disk was rotated at a measurement linear velocity V=11.3 m/sec, and an NRZI mark length recording random signal of ⅔ one seven R.L.L., 0.56 μm/bit, T (write clock period)=33 nsec was recorded on the disk using a recording/reproduction laser beam, which had N.A.=0.55, a wavelength=830 nm, and laser pulse rising and falling times of about 5 nsec under the following conditions. The number of types of marks was 7, i.e., 2T to 8T marks. An nT mark is a mark with which the width of a reproduction pulse becomes n times (e.g., twice for the 2T mark) of the clock period T when the recorded mark is reproduced.

Comparative Example 1

Figure 13:
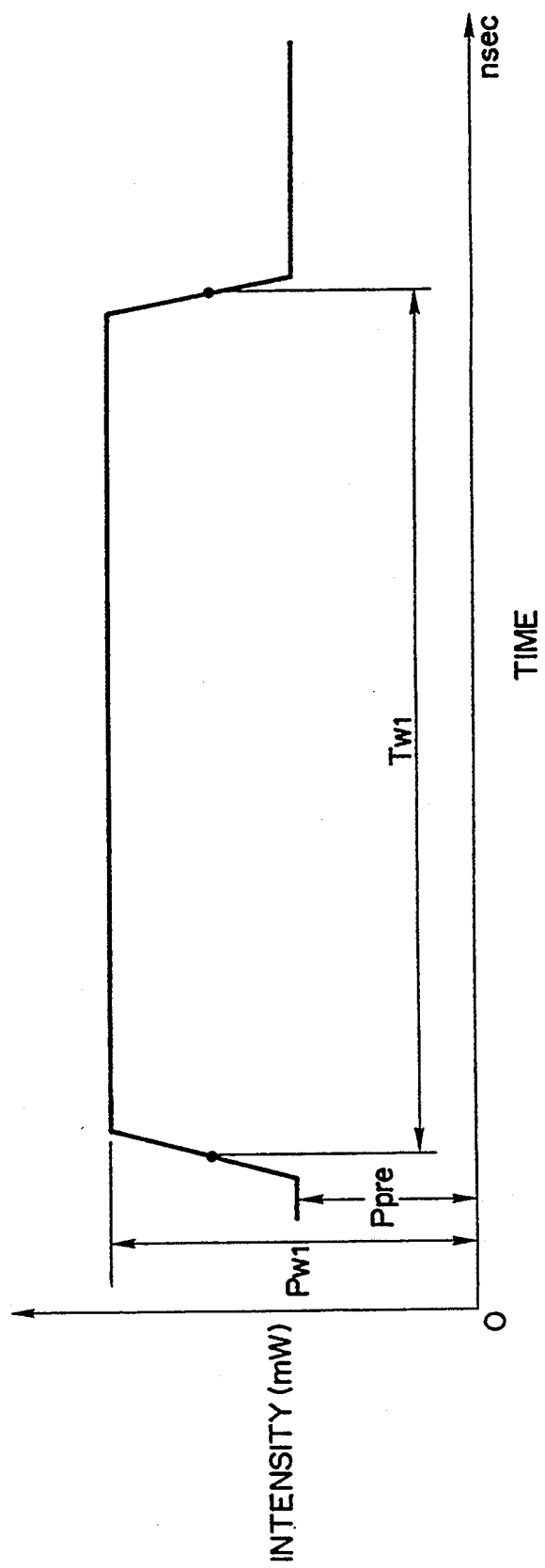
FIG. 13 is a waveform chart of a laser beam intensity when one mark is formed by a conventional method.
Figure 14:
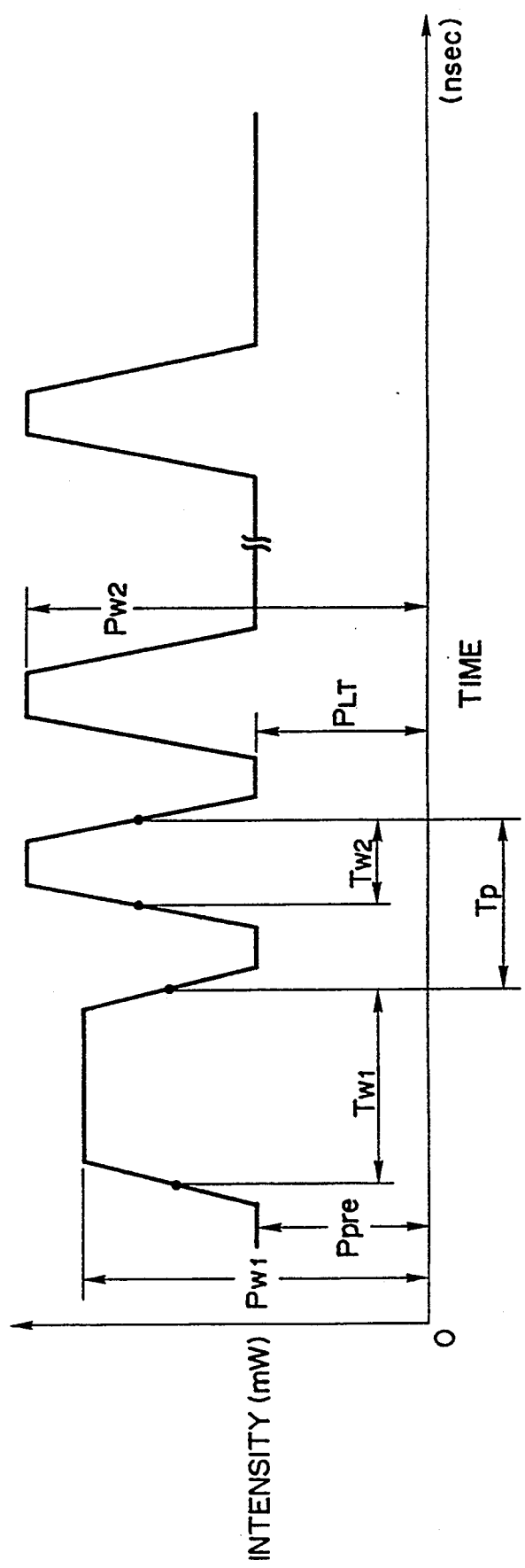
FIG. 14 is a waveform chart of a laser beam intensity when one mark is formed by the pulse train method.

As a pulse waveform, a simple waveform modulated by two values, i.e., $P_H$ and $P_L$, in the prior art, as shown in FIG. 13, was used. Recording conditions were $P_H$=11.2 mW (this value was selected to be equal to or smaller than a value for forming a mark with a desired width as an upper limit), and $P_L$=4.0 mW (this value was selected from an intensity range having, as an upper limit, an intensity which did not cause a high-temperature cycle, and, as a lower limit, an intensity at which a mark formed by the high-temperature cycle could be erased). Under these conditions, information was recorded and was reproduced at a reproduction laser beam intensity $P_R$=1.5 mW, and the recording data pattern dependencies of the leading and trailing edge positions of the mark were checked.

As a result, the leading edge position of the next mark after a 2T interval (an interval between the previous mark and the next mark) was shifted forward by about 3 nsec as compared to the leading edge position of the next mark after an 8T interval. In other words, the "recording data pattern dependency of the mark leading edge position" still remained.

Also, the trailing edge positions of 3T to 8T marks were shifted backward by a maximum of about 5 nsec as compared to the trailing edge position of a 2T mark. In other words, the "recording data pattern dependency of the mark trailing edge position" still remained.

Comparative Example 2

Figure 2:
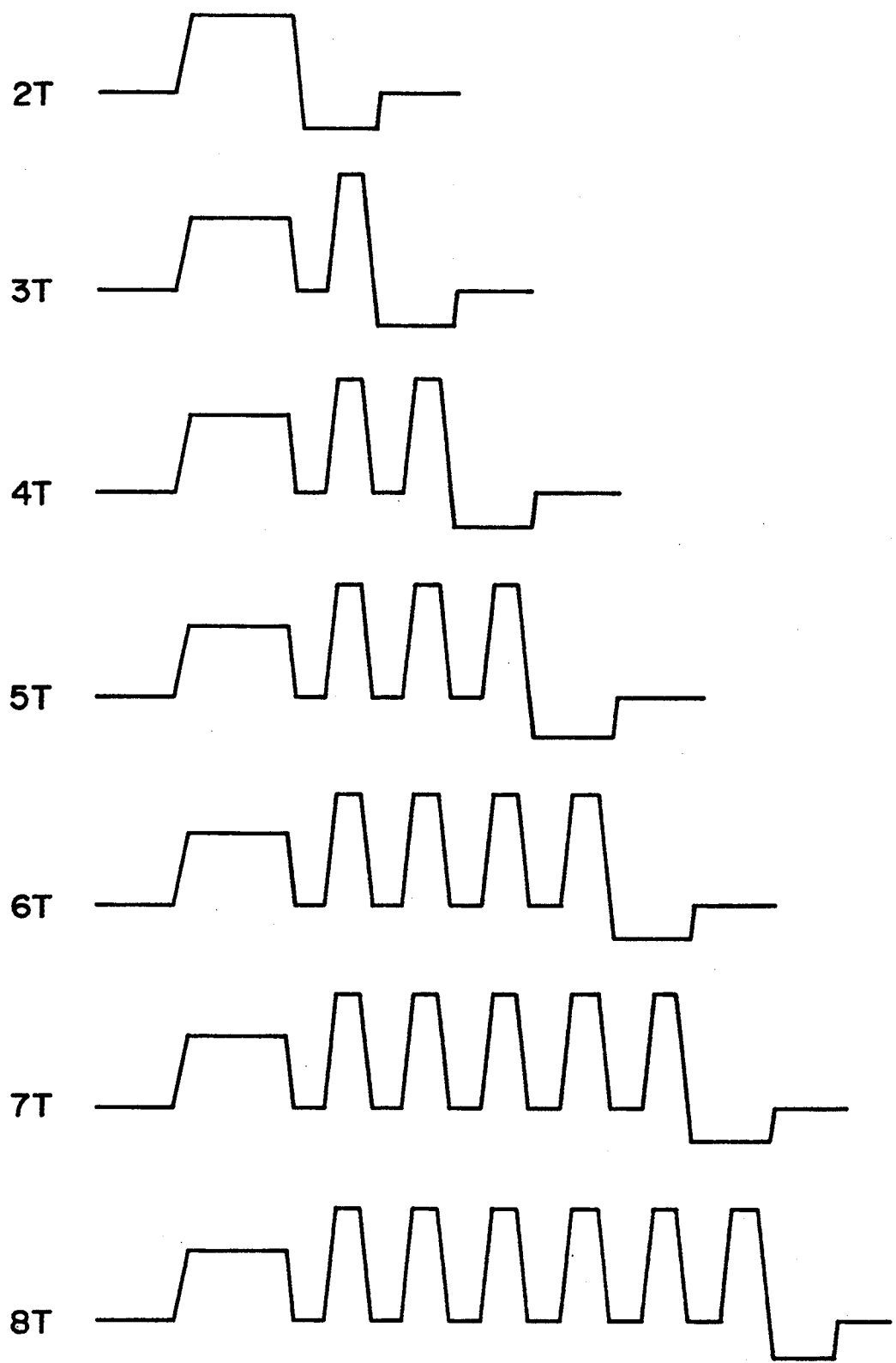
FIG. 2 is a waveform chart of a laser beam intensity when 2T to 8T marks used in the embodiment shown in FIG. 1 are formed.
Figure 15:
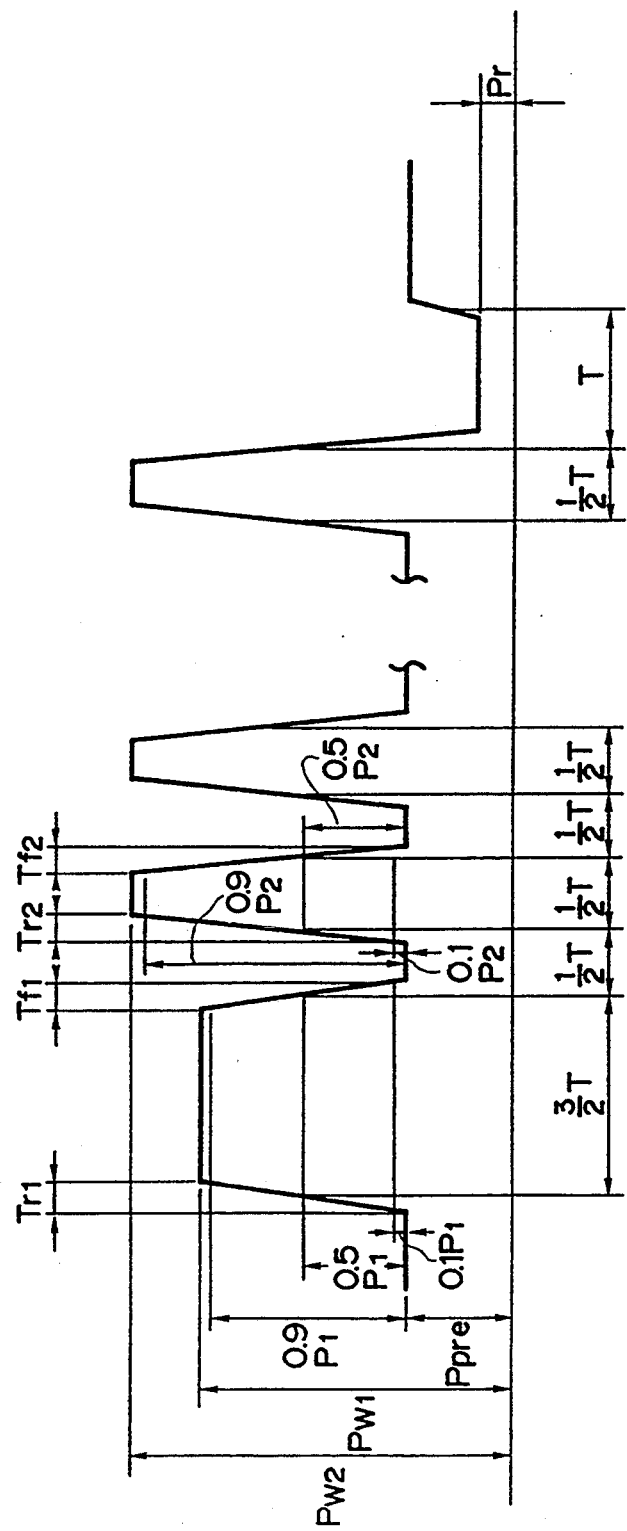
FIG. 15 is a waveform chart described in STANDARD ECMA/TC31/92/36 3rd Draft Proposal, p. 87.

As a pulse waveform, a waveform defined by the pulse train method and the heat shut off method, as shown in FIG. 2, was used. FIG. 2 is a waveform chart of a laser beam intensity when 2T to 8T marks are formed. See (a)–(g), respectively, in FIG. 2. According to STANDARD ECMA/TC31/92/36 3rd Draft Proposal, p. 87 (see FIG. 15), conditions were determined to have $T_{W1}$=50 nsec (=T×3/2), $T_p$=33 nsec (=T), $T_{W2}$=16.5 nsec (=T×½), and $T_{off}$=33 nsec (=T), $P_{LB}$=$P_r$=1.5 mW, and $P_H$, $P_L$, and $P_{W2}$ were respectively determined to have $P_H$=11.2 mW (this value was selected to be equal to or smaller than a value for forming a mark with a desired width as an upper limit), $P_L$=4.0 mW (this value was selected from an intensity range having, as an upper limit, an intensity which did not cause a high-temperature cycle, and, as a lower limit, an intensity at which a mark formed by the high-temperature cycle could be erased), and $P_{W2}$=11.4 mW (this value was set to be a value for minimizing the recording data pattern dependency of the mark trailing edge position). Under these conditions, information was recorded and was reproduced at a reproduction laser beam intensity $P_r$=1.5 mW, and the recording data pattern dependencies of the leading and trailing edge positions of the mark were checked.

As a result, the leading edge position of the next mark after a 2T interval (an interval between the previous mark and the next mark) was shifted forward by about 1 nsec as compared to the leading edge position of the next mark after an 8T interval. In other words, the "recording data pattern dependency of the mark leading edge position" still remained.

Example

As a pulse waveform, a waveform defined by the pulse train method and the heat shut off method, as shown in FIG. 2, was used as in [Comparative Example 2]. However, conditions were determined as follows.

Figure 3:
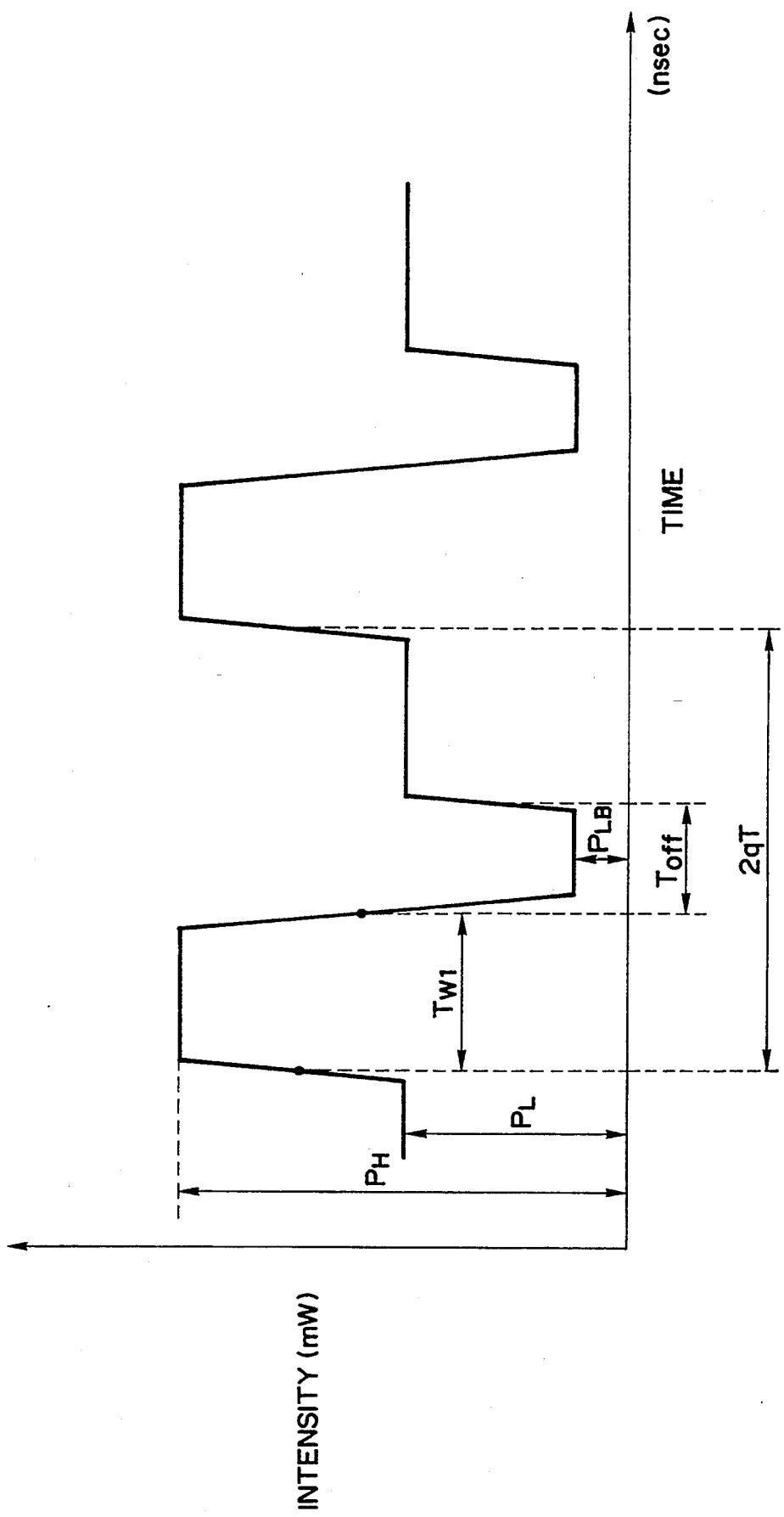
FIG. 3 is a waveform chart of an index pulse (1)

A plurality of combinations of $P_H$, $P_L$, $P_{LB}$, $T_{W1}$, and $T_{off}$, which satisfied formula (1), were selected. Using the selected values, an "index pulse (see FIG. 3), having a period 2qT (q is a value obtained by adding 1 to a minimum run length limit number, and T is the write clock period), for raising a laser beam intensity from $P_L$ to an intensity $P_H$ higher than $P_L$ so as to start mark formation by a high-temperature cycle, reducing the intensity to $P_{LB}$ lower than $P_L$ after $P_H$ is maintained for a time $T_{W1}$, raising the intensity to $P_L$ after $P_{LB}$ is maintained for a predetermined time $T_{off}$, and maintaining $P_L$ for a predetermined period of time" was recorded on and reproduced from a magnetooptical disk. In this case, when the reproduction signal has a duty ratio of 50%, optimal $P_H$, $P_L$, $P_{LB}$, $T_{W1}$, and $T_{off}$, i.e., optimal heat shut off conditions can be determined. With the above-mentioned method, $P_H$=11.2 mW, $P_L$=4.0 mW, $P_{LB}$=0 mW, $T_{W1}$=50 nsec, and $T_{off}$=40 nsec were obtained ($P_H$ was equal to or lower than a value for forming a mark with a desired width as an upper limit, and $P_L$ was an intensity selected from an intensity range having, as an upper limit, an intensity which did not cause a high-temperature cycle, and, as a lower limit, an intensity at which a mark formed by the high-temperature cycle could be erased).

Figure 4:
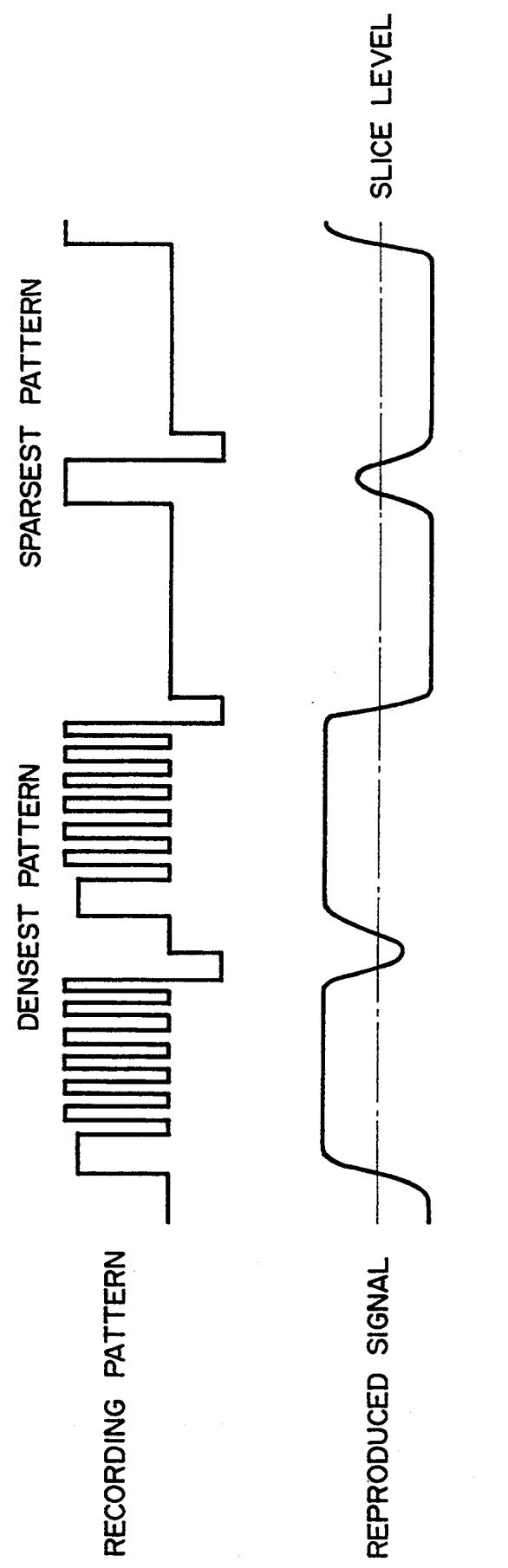
FIG. 4 is a waveform chart showing a waveform of a recording pattern in comparison with a reproduction signal waveform obtained by reproducing the recording pattern.

$P_H$, $P_L$, $P_{LB}$, $T_{W1}$, and $T_{off}$, which were obtained by the above-mentioned method, were substituted in formula (2) to select a plurality of combinations of $T_p$, $T_{W2}$, $P_{LT}$, and $P_{W2}$, which satisfied formula (2). Thereafter, using the values obtained by the above-mentioned method, and the selected values, marks were recorded on the magnetooptical disk with a pulse waveform, as shown in FIG. 2. In this case, slice levels of reproduction signals (see (b) in FIG. 4) obtained by recording and reproducing a "long mark-short interval-long mark" pattern (densest pattern) and a "long interval-short mark-long interval" pattern (sparsest pattern) (see (a) in FIG. 4) assumed a common value.

The slice level is a threshold value used upon binary coding of a reproduction signal. As a method of determining the slice level, the following method is available.

A reproduction signal is envelope-detected by an envelope detection circuit at both the positive and negative polarity sides. A level (e.g., an intermediate value level) between the level of the envelope-detection signal at the positive polarity side and the level of the envelope-detection signal at the negative polarity side is determined as the slice level. Based on the slice level determined in this manner, a reproduction signal is binary-coded depending on whether the level of the reproduction signal is higher or lower than the slice level.

The slice level is normally determined by utilizing the waveform of the reproduction signal, as described above. For this reason, reproduction signals often have different slice levels if they have different waveforms.

In this example, as described above, the respective values are selected, so that the reproduction signals of the densest and sparsest patterns have a common slice level.

Thus, optimal $T_p$, $T_{W2}$, $P_{LT}$, and $P_{W2}$, i.e., optimal pulse train conditions can be determined. With the above-mentioned method, $T_p=33$ nsec ($=T$), $T_{W2}=16.5$ nsec ($=T\times\frac{1}{2}$), $P_{LT}=P_L=4.0$ mW, and $P_{W2}=11.4$ mW were obtained.

Under these conditions, information was recorded and was reproduced at a reproduction laser beam intensity $P_r=1.5$ mW, and the recording data pattern dependencies of the leading and trailing edge positions of the mark were checked. As a result, the dependencies fell within a measurement error range, and were not measured.

As described above, according to the present invention, when information is recorded on a magnetooptical disk by the over-write method, optimal recording conditions can be determined. When magnetooptical recording is executed using the optimal conditions, the "recording data pattern dependency of the mark trailing edge position" and "recording data pattern dependency of the mark leading edge position" can be minimized all the time for any optical disk. As a result, high-density recording can always be attained, and a decrease in identifiability of data can always be avoided.

What is claimed is:

1. In a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on said magnetooptical disk by a high-temperature cycle, thereafter, the intensity is reduced to an intensity $P_{LB}$ lower than $P_L$, and the intensity is raised to $P_L$ after an elapse of a time $T_{off}$, the improvement characterized in that the intensity $P_L$ is selected from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased, by over-writing at least one of $P_L$, $T_{off}$, and $P_{LB}$ is controlled to achieve the pre-heat state within a time until the intensity is raised to $P_H$ again, and at least one of $P_{W2}$, $P_{LT}$, and a time $T_{W2}$ for maintaining $P_{W2}$ is controlled, so that a temperature, after an elapse of $T_{W1}$, at a peak temperature position or a spot center position of the laser beam radiated onto the magnetooptical disk surface becomes equal to a temperature after an elapse of $T_{W2}$.

2. In a magnetooptical recording method in which an intensity of a laser beam to be radiated onto an over-write capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on said magnetooptical disk by a high-temperature cycle, thereafter, the intensity is reduced to an intensity $P_{LB}$ lower than $P_L$, and the intensity is raised to $P_L$ after an elapse of a time $T_{off}$, the improvement characterized in that the intensity $P_L$ is selected from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased, by over-writing and the respective values are determined as a combination for satisfying the following formulas (1) and (2):

$$T_{off} = \tau \times \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of said magnetooptical disk, and $T_{W2}$ is a time for maintaining $P_{W2}$.

3. A method according to claim 1, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_L'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

4. A method according to claim 2, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

5. A method according to claim 1, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}''''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

6. A method according to claim 2, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}''''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

7. A method according to claim 1, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}''''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

8. A method according to claim 2, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}''''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

9. A method according to claim 1, wherein the intensity $P_{LT}$ is set to be equal to the intensity $P_L$.

10. A method according to claim 2, wherein the intensity $P_{LT}$ is set to be equal to the intensity $P_L$.

11. A method according to claim 1, wherein the intensity $P_{LT}$ is set to be higher than the intensity $P_L$.

12. A method according to claim 2, wherein the intensity $P_{LT}$ is set to be higher than the intensity $P_L$.

13. A method according to claim 1, wherein the modulation period $T_p$ upon intensity-modulation of the laser beam between $P_{LT}$ and the intensity $P_{W2}$ higher than $P_{LT}$ is set to be equal to the write clock period T.

14. A method according to claim 2, wherein the modulation period $T_p$ upon intensity-modulation of the laser beam between $P_{LT}$ and the intensity $P_{W2}$ higher than $P_{LT}$ is set to be equal to the write clock period T.

15. A method according to claim 1, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

16. A method according to claim 2, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

17. A method according to claim 1, wherein the time $T_{W2}$ is set to be equal to the time $T_p$, and the time for maintaining $P_{LT}$ is set to be zero.

18. A method according to claim 2, wherein the time $T_{W2}$ is set to be equal to the time $T_p$, and the time for maintaining $P_{LT}$ is set to be zero.

19. A method according to claim 1, wherein the intensity $P_H$ is selected to be equal to or smaller than a value for forming a mark with a desired width as an upper limit.

20. A method according to claim 2, wherein the intensity $P_H$ is selected to be equal to or smaller than a value for forming a mark with a desired width as an upper limit.

21. A method according to claim 1, wherein the intensity $P_{W2}$ is set to be equal to the intensity $P_H$.

22. A method according to claim 2, wherein the intensity $P_{W2}$ is set to be equal to the intensity $P_H$.

23. A method according to claim 1, wherein the intensity $P_{W2}$ is set to be lower than the intensity $P_H$.

24. A method according to claim 2, wherein the intensity $P_{W2}$ is set to be lower than the intensity $P_H$.

25. A method according to claim 1, wherein the intensity $P_{LB}$ is set to be equal to a laser beam intensity in a reproduction mode or to be zero.

26. A method according to claim 2, wherein the intensity $P_{LB}$ is set to be equal to a laser beam intensity in a reproduction mode or to be zero.

27. A method according to claim 1, wherein the time $T_{off}$ is set to be equal to or close to a value m/n times (m and n are natural numbers) of the write clock period T.

28. A method according to claim 2, wherein the time $T_{off}$ is set to be equal to or close to a value m/n times (m and n are natural numbers) of the write clock period T.

29. A magnetooptical recording apparatus comprising:

a laser source for emitting a laser beam;

radiation means for radiating the laser beam onto an over-write capable magnetooptical disk;

moving means for changing a radiation position of the laser beam on said magnetooptical disk;

first modulation means for raising an intensity of the laser beam to be radiated onto said magnetooptical disk from $P_L$ to an intensity $P_H$ higher than $P_L$, reducing the intensity to an intensity $P_{LT}$ lower than $P_H$ after $P_H$ is maintained for a time $T_{W1}$, and thereafter, intensity-modulating the laser beam at a period $T_p$ between $P_{LT}$ and an intensity $P_{W2}$ higher than $P_{LT}$ so as to form a mark by a high-temperature cycle;

second modulation means for reducing the intensity to an intensity $P_{LB}$ lower than $P_L$ after the mark is formed on said magnetooptical disk, and raising the intensity to $P_L$ after an elapse of a time $T_{off}$;

condition determination means for selecting $P_L$ from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; by over-writing first control means for controlling at least one of $P_L$, $T_{off}$, and $P_{LB}$ so that the pre-heat state is established within a time period until the intensity is raised to $P_H$ again to form the next mark; and second control means for controlling at least one of $P_{W2}$, $P_{LT}$, and $T_{W2}$, so that a temperature, after an elapse of $T_{W1}$, at a peak temperature position or a spot center position of the laser beam radiated onto the magnetooptical disk surface becomes equal to a temperature after an elapse of $T_{W2}$.

30. A magnetooptical recording apparatus comprising:

a laser source for emitting a laser beam;

radiation means for radiating the laser beam onto an over-write capable magnetooptical disk;

moving means for changing a radiation position of the laser beam on said magnetooptical disk;

first modulation means for raising an intensity of the laser beam to be radiated onto said magnetooptical disk from $P_L$ to an intensity $P_H$ higher than $P_L$, reducing the intensity to an intensity $P_{LT}$ lower than $P_H$ after $P_H$ is maintained for a time $T_{W1}$, and thereafter, intensity-modulating the laser beam at a period $T_p$ between $P_{LT}$ and an intensity $P_{W2}$ higher than $P_{LT}$ so as to form a mark by a high-temperature cycle;

second modulation means for reducing the intensity to an intensity $P_{LB}$ lower than $P_L$ after the mark is formed on said magnetooptical disk, and raising the intensity to $P_L$ after an elapse of a time $T_{off}$;

condition determination means for selecting $P_L$ from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; by over-writing and condition determination means for determining the respective values as a combination for satisfying the following formulas (1) and (2):

$$T_{off} = \tau \times \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of said magnetooptical disk, and $T_{W2}$ is a time for maintaining $P_{W2}$.

31. An apparatus according to claim 29, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

32. An apparatus according to claim 30, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

33. An apparatus according to claim 29, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

34. An apparatus according to claim 30, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

35. An apparatus according to claim 29, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

36. An apparatus according to claim 30, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

37. An apparatus according to claim 29, wherein the intensity $P_{LT}$ is set to be equal to the intensity $P_L$.

38. An apparatus according to claim 30, wherein the intensity $P_{LT}$ is set to be equal to the intensity $P_L$.

39. An apparatus according to claim 29, wherein the intensity $P_{LT}$ is set to be higher than the intensity $P_L$.

40. An apparatus according to claim 30, wherein the intensity $P_{LT}$ is set to be higher than the intensity $P_L$.

41. An apparatus according to claim 29, wherein the modulation period $T_p$ upon intensity-modulation of the laser beam between $P_{LT}$ and the intensity $P_{W2}$ higher than $P_{LT}$ is set to be equal to the write clock period T.

42. An apparatus according to claim 30, wherein the modulation period $T_p$ upon intensity-modulation of the laser beam between $P_{LT}$ and the intensity $P_{W2}$ higher than $P_{LT}$ is set to be equal to the write clock period T.

43. An apparatus according to claim 29, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

44. An apparatus according to claim 30, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

45. An apparatus according to claim 29, wherein the time $T_{W2}$ is set to be equal to the time $T_p$, and the time for maintaining $P_{LT}$ is set to be zero.

46. An apparatus according to claim 30, wherein the time $T_{W2}$ is set to be equal to the time $T_p$, and the time for maintaining $P_{LT}$ is set to be zero.

47. An apparatus according to claim 29, wherein the intensity $P_H$ is selected to be equal to or smaller than a value for forming a mark with a desired width as an upper limit.

48. An apparatus according to claim 30, wherein the intensity $P_H$ is selected to be equal to or smaller than a value for forming a mark with a desired width as an upper limit.

49. An apparatus according to claim 29, wherein the intensity $P_{W2}$ is set to be equal to the intensity $P_H$.

50. An apparatus according to claim 30, wherein the intensity $P_{W2}$ is set to be equal to the intensity $P_H$.

51. An apparatus according to claim 29, wherein the intensity $P_{W2}$ is set to be lower than the intensity $P_H$.

52. An apparatus according to claim 30, wherein the intensity $P_{W2}$ is set to be lower than the intensity $P_H$.

53. An apparatus according to claim 29, wherein the intensity $P_{LB}$ is set to be equal to a laser beam intensity in a reproduction mode or to be zero.

54. An apparatus according to claim 30, wherein the intensity $P_{LB}$ is set to be equal to a laser beam intensity in a reproduction mode or to be zero.

55. An apparatus according to claim 29, wherein the time $T_{off}$ is set to be equal to or close to a value m/n times (m and n are natural numbers) of the write clock period T.

56. An apparatus according to claim 30, wherein the time $T_{off}$ is set to be equal to or close to a value m/n times (m and n are natural numbers) of the write clock period T.

57. A method for determining recording conditions for a magnetooptical recording method in which an intensity of a laser beam to be radiated onto an overwrite capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on said magnetooptical disk by a high-temperature cycle, thereafter, the intensity is reduced to an intensity $P_{LB}$ lower than $P_L$, and the intensity is raised to $P_L$ after an elapse of a time $T_{off}$, comprising the steps of:

selecting the intensity $P_L$ from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; by over-writing determining a combination of $P_L$, $T_{off}$, and $P_{LB}$, so that the pre-heat state is established within a time period until the intensity is raised to $P_H$ again to form the next mark; and determining a combination of $P_{W2}$, $P_{LT}$, and $T_{W2}$, so that a temperature, after an elapse of $T_{W1}$, at a peak temperature position or a spot center position of the laser beam radiated onto the magnetooptical disk surface becomes equal to a temperature after an elapse of $T_{W2}$ ($T_{W2}$ is a time for maintaining $P_{W2}$).

58. A method for determining recording conditions for a magnetooptical recording method in which an intensity of a laser beam to be radiated onto an overwrite capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on said magnetooptical disk by a high-temperature cycle, thereafter, the intensity is reduced to an intensity $P_{LB}$ lower than $P_L$, and the intensity is raised to $P_L$ after an elapse of a time $T_{off}$, comprising the steps of:

selecting the intensity $P_L$ from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; by over-writing and determining the respective values as a combination for satisfying the following formulas (1) and (2):

$$T_{off} = \tau \ln[\{(P_H - P_{LB}) - (P_H - P_L) \times \exp(-T_{W1}/\tau)\} \div (P_L - P_{LB})] \quad \text{formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \quad \text{formula (2)}$$

where $\tau$ is the thermal time constant of said magnetooptical disk, and $T_{W2}$ is a time for maintaining $P_{W2}$.

59. A method according to claim 57, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

60. A method according to claim 58, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

61. A method according to claim 57, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

62. A method according to claim 58, wherein values of $P_L''$, $P_H''$, $P_{W2}''$, $P_{LT}''$, $P_{LB}$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

63. A method according to claim 57, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_H'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

64. A method according to claim 58, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}$, $T_p''$, $T_{off}'''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

65. A method according to claim 57, wherein the intensity $P_{LT}$ is set to be equal to the intensity $P_L$.

66. A method according to claim 58, wherein the intensity $P_{LT}$ is set to be equal to the intensity $P_L$.

67. A method according to claim 57, wherein the intensity $P_{LT}$ is set to be higher than the intensity $P_L$.

68. A method according to claim 58, wherein the intensity $P_{LT}$ is set to be higher than the intensity $P_L$.

69. A method according to claim 57, wherein the modulation period $T_p$ upon intensity-modulation of the laser beam between $P_{LT}$ and the intensity $P_{W2}$ higher than $P_{LT}$ is set to be equal to the write clock period T.

70. A method according to claim 58, wherein the modulation period $T_p$ upon intensity-modulation of the laser beam between $P_{LT}$ and the intensity $P_{W2}$ higher than $P_{LT}$ is set to be equal to the write clock period T.

71. A method according to claim 57, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

72. A method according to claim 58, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

73. A method according to claim 57, wherein the time $T_{W2}$ is set to be equal to the time $T_p$, and the time for maintaining $P_{LT}$ is set to be zero.

74. A method according to claim 58, wherein the time $T_{W2}$ is set to be equal to the time $T_p$, and the time for maintaining $P_{LT}$ is set to be zero.

75. A method according to claim 57, wherein the intensity $P_H$ is selected to be equal to or smaller than a value for forming a mark with a desired width as an upper limit.

76. A method according to claim 58, wherein the intensity $P_H$ is selected to be equal to or smaller than a value for forming a mark with a desired width as an upper limit.

77. A method according to claim 57, wherein the intensity $P_{W2}$ is set to be equal to the intensity $P_H$.

78. A method according to claim 58, wherein the intensity $P_{W2}$ is set to be equal to the intensity $P_H$.

79. A method according to claim 57, wherein the intensity $P_{W2}$ is set to be lower than the intensity $P_H$.

80. A method according to claim 58, wherein the intensity $P_{W2}$ is set to be lower than the intensity $P_H$.

81. A method according to claim 57, wherein the intensity $P_{LB}$ is set to be equal to a laser beam intensity in a reproduction mode or to be zero.

82. A method according to claim 58, wherein the intensity $P_{LB}$ is set to be equal to a laser beam intensity in a reproduction mode or to be zero.

83. A method according to claim 57, wherein the time $T_{off}$ is set to be equal to or close to a value m/n times (m and n are natural numbers) of the write clock period T.

84. A method according to claim 58, wherein the time $T_{off}$ is set to be equal to or close to a value m/n times (m and n are natural numbers) of the write clock period T.

85. An apparatus for determining recording conditions for a magnetooptical recording method in which an intensity of a laser beam to be radiated onto an overwrite capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on said magnetooptical disk by a high-temperature cycle, thereafter, the intensity is reduced to an intensity $P_{LB}$ lower than $P_L$, and the intensity is raised to $P_L$ after an elapse of a time $T_{off}$, comprising:

a first calculation unit for selecting the intensity $P_L$ from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; by over-writing a second calculation unit for calculating a combination of $P_L$, $T_{off}$, and $P_{LB}$, so that the pre-heat state is established within a time period until the intensity is raised to $P_H$ again to form the next mark;

a third calculation unit for calculating a combination of $P_{W2}$, $P_{LT}$, and $T_{W2}$, so that a temperature, after an elapse of $T_{W1}$, at a peak temperature position or a spot center position of the laser beam radiated onto the magnetooptical disk surface becomes equal to a temperature after an elapse of $T_{W2}$ ($T_{W2}$ is a time for maintaining $P_{W2}$); and an output unit for outputting the values calculated by said first to third calculation units.

86. An apparatus for determining recording conditions for a magnetooptical recording method in which an intensity of a laser beam to be radiated onto an overwrite capable magnetooptical disk is raised from $P_L$ to an intensity $P_H$ higher than $P_L$, the intensity is reduced to an intensity $P_{LT}$ lower than $P_H$ after $P_H$ is maintained for a time $T_{W1}$, the laser beam is intensity-modulated at a period $T_p$ between $P_{LT}$ and an intensity $P_{W2}$ higher than $P_{LT}$ so as to form a mark on said magnetooptical disk by a high-temperature cycle, thereafter, the intensity is reduced to an intensity $P_{LB}$ lower than $P_L$, and the intensity is raised to $P_L$ after an elapse of a time $T_{off}$, comprising:

a first calculation unit for selecting the intensity $P_L$ from an intensity range defined between an upper limit and a lower limit, the upper limit being a laser beam intensity for maintaining a pre-heat state in which a temperature on said magnetooptical disk becomes a predetermined temperature $\Theta_{pre}$, and the upper limit also being an intensity which does not cause the high-temperature cycle, and the lower limit being an intensity at which a mark formed by the high-temperature cycle can be erased; by over-writing a second calculation unit for calculating the respective values as a combination for satisfying the following formulas (1) and (2); and an output unit for outputting the values calculated by said first and second calculation units:

$$T_{off} = \tau \times \ln[\{(P_H - P_{LB}) - (P_H - P_L) \times \exp(-T_{W1}/\tau)\} \div (P_L - P_{LB})] \text{ formula (1)}$$

$$(P_H - P_L) \times \{1 - \exp(-T_{W1}/\tau)\} \times \{1 - \exp(-T_p/\tau)\} = (P_{LT} - P_L) \times \{1 - \exp(-T_p/\tau)\} + (P_{W2} - P_{LT}) \times \{1 - \exp(-T_{W2}/\tau)\} \text{ formula (2)}$$

where $\tau$ is the thermal time constant of said magnetooptical disk, and $T_{W2}$ is a time for maintaining $P_{W2}$.

87. An apparatus according to claim 85, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

88. An apparatus according to claim 86, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period) for raising a laser beam intensity from $P_L'$ to an intensity $P_H'$ higher than $P'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be the values of $P_L$, $P_H$, $P_{LB}$, $T_{W1}$, and $T_{off}$.

89. An apparatus according to claim 85, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

90. An apparatus according to claim 86, wherein values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (2) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (2), are respectively determined to be the value of $P_L$, $P_H$, $P_{W2}$, $P_{LT}$, $P_{LB}$, $T_{W1}$, $T_p$, $T_{off}$, and $T_{W2}$.

91. An apparatus according to claim 85, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to lower than $P_L''$ so as to end the mark formation, and raising the intensity to $P_L''$ after $P_{LB}''$ is maintained for a predetermined time $T_{off}'''$, which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

92. An apparatus according to claim 86, wherein values of $P_L'$, $P_H'$, $P_{LB}'$, $T_{W1}'$, and $T_{off}'$ of an "index pulse (1), having a period 2qT (q is a value obtained by adding 1 to a minimum run length limit number, and T is the write clock period), for raising a laser beam intensity from $P_L'$ to an intensity $P_H'$ higher than $P_L'$ so as to start mark formation by a high-temperature cycle, reducing the intensity to $P_{LB}'$ lower than $P_L'$ after $P_H'$ is maintained for a time $T_{W1}'$, raising the intensity to $P_L'$ after $P_{LB}'$ is maintained for a predetermined time $T_{off}'$, and maintaining $P_L'$ for a predetermined period of time", which values cause a reproduction signal obtained by recording and reproducing the index pulse (1) on and from said magnetooptical disk to have a duty ratio of 50%, are respectively determined to be values of $P_L''$, $P_H''$, $P_{LB}''$, $T_{W1}''$, and $T_{off}''$, and values of $P_L''$, $P_H''$, $P_{W2}''$, $P_{LT}''$, $P_{LB}''$, $T_{W1}''$, $T_p''$, $T_{off}''$, and a time $T_{W2}''$ for maintaining $P_{W2}''$ of an "index pulse (3) for raising a laser beam intensity from $P_L''$ to an intensity $P_H''$ higher than $P_L''$ so as to start mark formation by a high-temperature cycle, reducing the intensity to an intensity $P_{LT}''$ lower than $P_H''$ after $P_H''$ is maintained for a time $T_{W1}''$, intensity-modulating the laser beam between $P_{LT}''$ and an intensity $P_{W2}''$ higher than $P_{LT}''$ at a period $T_p''$ so as to continue the mark formation, thereafter, reducing the intensity to $P_{LB}''$ lower than $P_L''$ so as to end the mark formation, and raising the intensity to $P_L''$ after $P_{LB}''$ is maintained for a predetermined time $T_{off}'''$", which values provide a slice level common to reproduction signals respectively obtained by recording and reproducing a "long mark-short interval-long mark" pattern (densest pattern) and a "long interval-short mark-long interval" pattern (sparsest pattern) on and from said magnetooptical disk using the index pulse (3), are respectively determined to be the value of $P_L$, $P_H$, $P_{W2}$, $P_{LT}$, $P_{LB}$, $T_{W1}$, $T_p$, $T_{off}$, and $T_{W2}$.

93. An apparatus according to claim 85, wherein the intensity $P_{LT}$ is set to be equal to the intensity $P_L$.

94. An apparatus according to claim 86, wherein the intensity $P_{LT}$ is set to be equal to the intensity $P_L$.

95. An apparatus according to claim 85, wherein the intensity $P_{LT}$ is set to be higher than the intensity $P_L$.

96. An apparatus according to claim 86, wherein the intensity $P_{LT}$ is set to be higher than the intensity $P_L$.

97. An apparatus according to claim 85, wherein the modulation period $T_p$ upon intensity-modulation of the laser beam between $P_{LT}$ and the intensity $P_{W2}$ higher than $P_{LT}$ is set to be equal to the write clock period T.

98. An apparatus according to claim 86, wherein the modulation period $T_p$ upon intensity-modulation of the laser beam between $P_{LT}$ and the intensity $P_{W2}$ higher than $P_{LT}$ is set to be equal to the write clock period T.

99. An apparatus according to claim 85, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

100. An apparatus according to claim 86, wherein the time $T_{W2}$ for maintaining $P_{W2}$ is set to be m/n times (m and n are natural numbers; m<n) of the modulation period $T_p$ upon intensity-modulation of the laser beam between $P_{LT}$ and the intensity $P_{W2}$ higher than $P_{LT}$.

101. An apparatus according to claim 85, wherein the time $T_{W2}$ is set to be equal to the time $T_p$, and the time for maintaining $P_{LT}$ is set to be zero.

102. An apparatus according to claim 86, wherein the time $T_{W2}$ is set to be equal to the time $T_p$, and the time for maintaining $P_{LT}$ is set to be zero.

103. An apparatus according to claim 85, wherein the intensity $P_H$ is selected to be equal to or smaller than a value for forming a mark with a desired width as an upper limit.

104. An apparatus according to claim 86, wherein the intensity $P_H$ is selected to be equal to or smaller than a value for forming a mark with a desired width as an upper limit.

105. An apparatus according to claim 85, wherein the intensity $P_{W2}$ is set to be equal to the intensity $P_H$.

106. An apparatus according to claim 86, wherein the intensity $P_{W2}$ is set to be equal to the intensity $P_H$.

107. An apparatus according to claim 85, wherein the intensity $P_{W2}$ is set to be lower than the intensity $P_H$.

108. An apparatus according to claim 86, wherein the intensity $P_{W2}$ is set to be lower than the intensity $P_H$.

109. An apparatus according to claim 85, wherein the intensity $P_{LB}$ is set to be equal to a laser beam intensity in a reproduction mode or to be zero.

110. An apparatus according to claim 86, wherein the intensity $P_{LB}$ is set to be equal to a laser beam intensity in a reproduction mode or to be zero.

111. An apparatus according to claim 85, wherein the time $T_{off}$ is set to be equal to or close to a value m/n times (m and n are natural numbers) of the write clock period T.

112. An apparatus according to claim 86, wherein the time $T_{off}$ is set to be equal to or close to a value m/n times (m and n are natural numbers) of the write clock period T.

* * * * *